United States Patent
Lee et al.

(10) Patent No.: US 9,298,251 B2
(45) Date of Patent: Mar. 29, 2016

(54) METHODS OF SPREADING PLURALITY OF INTERRUPTS, INTERRUPT REQUEST SIGNAL SPREADER CIRCUITS, AND SYSTEMS-ON-CHIPS HAVING THE SAME

(71) Applicants: Jae-Gon Lee, Yongin-si (KR); Dong-Keun Kim, Seoul (KR); Si-Young Kim, Seoul (KR); Jung-Hun Heo, Suwon-si (KR)

(72) Inventors: Jae-Gon Lee, Yongin-si (KR); Dong-Keun Kim, Seoul (KR); Si-Young Kim, Seoul (KR); Jung-Hun Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 513 days.

(21) Appl. No.: 13/677,775

(22) Filed: Nov. 15, 2012

(65) Prior Publication Data

US 2013/0198545 A1    Aug. 1, 2013

(30) Foreign Application Priority Data

Jan. 30, 2012 (KR) ................. 10-2012-0008822

(51) Int. Cl.
| | |
|---|---|
| G06F 1/00 | (2006.01) |
| G06F 1/32 | (2006.01) |
| G06F 13/24 | (2006.01) |
| G06F 9/48 | (2006.01) |
| G06F 9/50 | (2006.01) |

(52) U.S. Cl.
CPC ............ G06F 1/3243 (2013.01); G06F 1/3203 (2013.01); G06F 1/3287 (2013.01); G06F 9/4812 (2013.01); G06F 9/5094 (2013.01); G06F 13/24 (2013.01); Y02B 60/1217 (2013.01); Y02B 60/1239 (2013.01); Y02B 60/142 (2013.01); Y02B 60/32 (2013.01)

(58) Field of Classification Search
CPC ..... G06F 1/3215; G06F 1/3203; G06F 13/24; G06F 1/3287; Y02B 60/1217
See application file for complete search history.

(56) References Cited

U.S. PATENT DOCUMENTS

| | | | |
|---|---|---|---|
| 5,265,215 A * | 11/1993 | Fukuda et al. ................ 710/123 |
| 5,317,747 A | 5/1994 | Mochida et al. |
| 5,708,814 A * | 1/1998 | Short et al. .................... 710/260 |
| 5,765,003 A | 6/1998 | MacDonald et al. |
| 5,918,057 A | 6/1999 | Chou et al. |
| 7,685,347 B2 | 3/2010 | Gibbs |
| 2003/0105798 A1 | 6/2003 | Kim et al. |
| 2006/0069833 A1* | 3/2006 | Ruemmler et al. ........... 710/260 |
| 2006/0112208 A1 | 5/2006 | Accapadi et al. |
| 2006/0136642 A1 | 6/2006 | Ooi |
| 2007/0198870 A1 | 8/2007 | Cheng et al. |
| 2008/0172511 A1 | 7/2008 | Takata et al. |
| 2008/0229130 A1 | 9/2008 | Guan et al. |
| 2010/0122099 A1* | 5/2010 | Lim ..................... G06F 1/3209 713/320 |
| 2011/0072180 A1 | 3/2011 | Lee |
| 2011/0145461 A1 | 6/2011 | Zhao et al. |

FOREIGN PATENT DOCUMENTS

| | | |
|---|---|---|
| JP | 2008176360 A | 7/2008 |
| KR | 20110032675 A | 3/2011 |

* cited by examiner

*Primary Examiner* — Mohammed Rehman
*Assistant Examiner* — Gayathri Sampath
(74) *Attorney, Agent, or Firm* — Harness, Dickey & Pierce, P.L.C.

(57) ABSTRACT

In a method of power control for a system-on-chip, output of at least one of a first wakeup request signal and a second wakeup request signal is controlled such that a time interval between the output of the first wakeup request signal and the output of the second wakeup request signal is greater than or equal to a time interval threshold. The first wakeup request signal and the second wakeup request signal are one of concurrent and consecutive wakeup request signals.

24 Claims, 24 Drawing Sheets

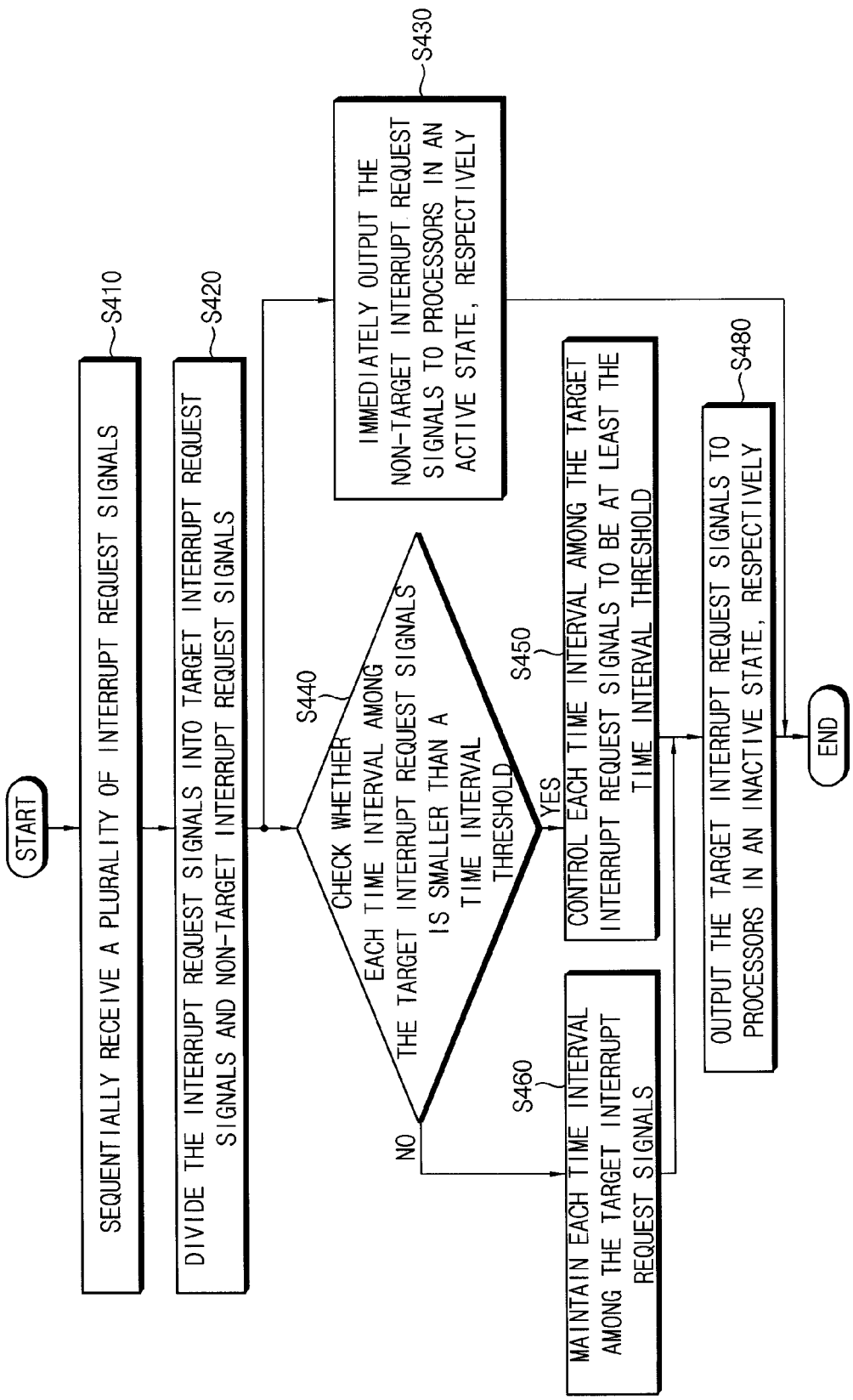

METHODS OF SPREADING PLURALITY OF INTERRUPTS, INTERRUPT REQUEST SIGNAL SPREADER CIRCUITS, AND SYSTEMS-ON-CHIPS HAVING THE SAME

CROSS-REFERENCE TO RELATED APPLICATION(S)

This application claims priority under 35 USC §119 to Korean Patent Application No. 10-2012-0008822, filed on Jan. 30, 2012 in the Korean Intellectual Property Office (KIPO), the contents of which are incorporated herein in their entirety by reference.

BACKGROUND

1. Technical Field

Example embodiments relate generally to multi-processor and/or multi-core systems, for example, methods of spreading a plurality of interrupts, interrupt request signal spreader circuit circuits, and systems-on-chips (SOCs) having the same.

2. Description of the Related Art

A conventional electric device includes an interrupt controller for interrupt handling operations. When a plurality of interrupt sources generate a plurality of interrupts, the interrupt controller may set priorities for the interrupts, and provide interrupt request signals to processors. The interrupt request signals are generated based on the interrupts.

Recently, a system-on-chip (SOC) has been more widely used in electric devices as electric devices become smaller and lighter. Here, SOCs may include a plurality of intellectual property (IP) blocks and a plurality of processors (or a processor having a plurality of cores).

In a SOC, processors frequently enter a low-power mode to reduce power consumption. The processors wake-up from the low-power mode in response to receiving respective interrupt request signals. As described above, interrupt request signals are generated based on the interrupts generated by a plurality of interrupt sources. However, if the processors substantially wake-up from the low-power mode at the same or substantially the same time (e.g., sometimes referred to as a sudden wake-up), then in-rush currents may result in the processors.

SUMMARY

One or more example embodiments provide methods of spreading a plurality of interrupt request signals capable of suppressing and/or preventing modes of a plurality of processors (or a plurality of cores in a multi-core processor) from being continuously changed from an inactive state (e.g., a power-down state, a power-off state, etc.) to an active state (e.g., a power-on state, etc.) within a relatively small time period even when a plurality of interrupts are continuously generated by a plurality of interrupt sources within a relatively small time period.

One or more other example embodiments provide interrupt request signal spreader circuits capable of suppressing and/or preventing modes of a plurality of processors (or a plurality of cores in a multi-core processor) from being continuously changed from an inactive state (e.g., a power-down state, a power-off state, etc.) to an active state (e.g., a power-on state, etc.) within a relatively small time period even when a plurality of interrupts are continuously generated by a plurality of interrupt sources within a relatively small time period.

Example embodiments also provide systems-on-chips having interrupt request signal spreader circuits.

By controlling time intervals between output of interrupt request signals (e.g., time intervals between output of adjacent interrupt request signals) to be greater than or equal to a time interval threshold, where the interrupt request signals are generated based on a plurality of interrupts, methods of spreading a plurality of interrupt request signals according to example embodiments may suppress and/or prevent modes of a plurality of processors (or a plurality of cores in a multi-core processor) from being continuously changed from an inactive state (e.g., a power-down state, a power-off state, etc.) to an active state (e.g., a power-on state, etc.) within a relatively small time period even when the interrupts are continuously generated by a plurality of interrupt sources within a relatively small time period. As a result, in-rush currents in the processors may be suppressed and/or prevented.

In addition, by controlling time intervals between a plurality of interrupt request signals (e.g., time intervals between adjacent interrupt request signals) to be greater than or equal to a time interval threshold, wherein the interrupt request signals are generated based on a plurality of interrupts, an interrupt request signal spreader circuit according to one or more example embodiments may suppress and/or prevent modes of a plurality of processors (or a plurality of cores in a multi-core processor) from being continuously changed from an inactive state (e.g., a power-down state, a power-off state, etc.) to an active state (e.g., a power-on state, etc.) within a relatively small time period even when the interrupts are continuously generated by a plurality of interrupt sources within a relatively small time period. As a result, in-rush currents in the processors may be suppressed and/or prevented.

Systems-on-chips according to example embodiments may include an interrupt request signal spreader circuit. Hence, systems-on-chips may achieve relatively high operational reliability by suppressing and/or preventing modes of a plurality of processors (or a plurality of cores in a multi-core processor) from being continuously changed from an inactive state (e.g., a power-down state, a power-off state, etc.) to an active state (e.g., a power-on state, etc.) within a relatively small time period.

At least one example embodiment provides a method of power control for a system-on-chip. According to at least this example embodiment, the method includes: controlling output of at least one of a first wakeup request signal and a second wakeup request signal such that a time interval between the output of the first wakeup request signal and the output of the second wakeup request signal is greater than or equal to a time interval threshold, the first wakeup request signal and the second wakeup request signal being one of concurrent and consecutive wakeup request signals.

At least one other example embodiment provides a method of power control for a system-on-chip. According to at least this example embodiment, the method includes: comparing a first priority of a first wakeup request signal with a second priority of a second wakeup request signal; and controlling output of at least one of the first wakeup request signal and the second wakeup request signal based on the comparison between the first priority and the second priority such that a time difference between the output of the first wakeup request signal and the output of the second wakeup request signal is greater than or equal to a time interval threshold.

At least one other example embodiment provides a method of power control for a system-on-chip. According to at least this example embodiment, the method includes: controlling output of at least one of a first wakeup request signal to a first processor in an inactive state and a second wakeup request signal to a second processor in the inactive state such that a time interval between the output of the first wakeup request signal to the first processor and the output of the second wakeup request signal to the second processor is greater than or equal to a time interval threshold, the first wakeup request signal and the second wakeup request signal being one of concurrent and consecutive wakeup request signals.

At least one other example embodiment provides a method of power control for a system-on-chip. According to at least this example embodiment, the method includes: comparing a first priority of a first wakeup request signal with a second priority of a second wakeup request signal, each of the first wakeup request signal and the second wakeup request signal being associated with a function block in an inactive state; and controlling output of at least one of the first wakeup request signal and the second wakeup request signal based on the comparison between the first priority and the second priority such that a time difference between output of the first wakeup request signal and output of the second wakeup request signal is greater than or equal to a time interval threshold.

At least one other example embodiment provides a system-on-chip including: wakeup request signal spreading circuit configured to control an output of at least one of a first wakeup request signal to a first function block and a second wakeup request signal to a second function block such that a time interval between output of the first wakeup request signal to the first function block and output of the second wakeup request signal to the second function block is greater than or equal to a time interval threshold, the first wakeup request signal and the second wakeup request signal being one of concurrent and consecutive wakeup request signals.

At least one other example embodiment provides a system-on-chip including: a wakeup request signal spreading circuit configured to compare a first priority of a first wakeup request signal with a second priority of a second wakeup request signal, the wakeup request signal spreading circuit being further configured to control output of at least one of the first wakeup request signal and the second wakeup request signal based on the comparison between the first priority and the second priority such that a time difference between output of the first wakeup request signal and output of the second wakeup request signal is greater than or equal to a time interval threshold.

At least one other example embodiment provides a system-on-chip including: a wakeup request signal spreading circuit configured to control output of at least one of a first wakeup request signal to a first function block in an inactive state and a second wakeup request signal to a second function block in an inactive state such that a time interval between output of the first wakeup request signal and output of the second wakeup request signal is greater than or equal to a time interval threshold, the first wakeup request signal and the second wakeup request signal being one of concurrent and consecutive wakeup request signals.

At least one other example embodiment provides a system-on-chip including: a wakeup request signal spreading circuit configured to compare a first priority of a first wakeup request signal with a second priority of a second wakeup request signal, each of the first wakeup request signal and the second wakeup request signal being associated with a function block in an inactive state, the wakeup request signal spreading circuit being further configured to control output of at least one of the first wakeup request signal and the second wakeup request signal based on the comparison between the first priority and the second priority such that a time difference between output of the first wakeup request signal and output of the second wakeup request signal is greater than or equal to a time interval threshold.

At least one other example embodiment provides a system-on-chip including: a plurality of wakeup request signal sources configured to generate at least first and second wakeup signals; a wakeup signal controller configured to generate at least a first and a second wakeup request signal based on the first and second wakeup signals; a plurality of processors configured to transition from an inactive state to an active state based on the first and second wakeup request signals; and a wakeup request signal spreading circuit configured to control an output of at least one of the first wakeup request signal to a first of the plurality of processors and the second wakeup request signal to a second of the plurality of processors such that a time interval between output of the first wakeup request signal and output of the second wakeup request signal is greater than or equal to a time interval threshold, the first wakeup request signal and the second wakeup request signal being one of concurrent and consecutive wakeup request signals.

At least one other example embodiment provides a multi-core system comprising: a plurality of wakeup signal sources configured to generate at least first and second wakeup signals; a wakeup signal controller configured to generate at least first and second wakeup request signals based on the first and second wakeup signals; a multicore processor including at least a first core and a second core, the first core being configured to receive the first wakeup request signal, and the second core being configured to receive the second wakeup request signal; a wakeup request signal spreading circuit configured to control an output of at least one of the first wakeup request signal to the first core and the second wakeup request signal to the second core such that a time interval between output of the first wakeup request signal and output of the second wakeup request signal is greater than or equal to a time interval threshold, the first wakeup request signal and the second wakeup request signal being one of concurrent and consecutive wakeup request signals; and at least one memory device configured to interface with the plurality of wakeup signal sources and the multi-core processor via a system bus.

BRIEF DESCRIPTION OF THE DRAWINGS

Illustrative, non-limiting example embodiments will be more clearly understood from the following detailed description taken in conjunction with the accompanying drawings.

FIG. 10 is a flow chart illustrating a method of spreading a plurality of interrupt request signals according to another example embodiment.

DETAILED DESCRIPTION

Figure 1:
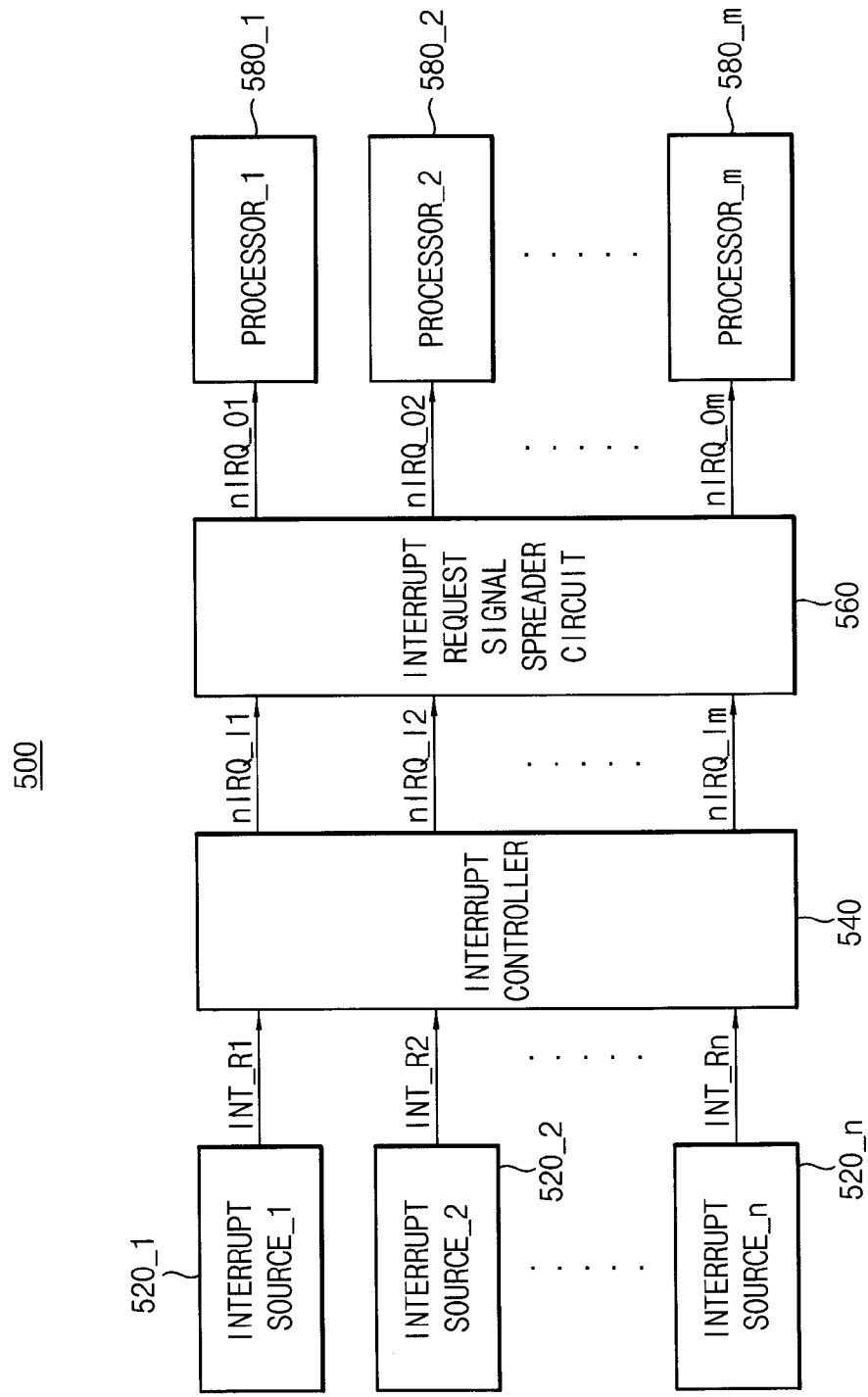
FIG. 1 is a block diagram illustrating a system-on-chip according to an example embodiment.

Various example embodiments will be described more fully hereinafter with reference to the accompanying drawings, in which some example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a system-on-chip according to an example embodiment.

Referring to FIG. 1, the system-on-chip 500 includes first through (n)th interrupt sources 520_1 through 520_n, an interrupt controller 540, an interrupt request signal spreader circuit 560, and first through (m)th processors 580_1 through 580_m. As discussed herein, the interrupt request signal spreader circuit 560 may be referred to as a wakeup request signal spreading circuit and/or an interrupt request signal spreading circuit. An interrupt request signal may be referred to as a wakeup request signal. Similarly, the interrupt controller 540 may be referred to as a wakeup signal controller and an interrupt may be referred to as a wakeup signal.

In at least some example embodiments, the number of interrupt sources 520_1 through 520_n may be greater than the number of processors 580_1 through 580_m. In other example embodiments, however, the number of interrupt sources 520_1 through 520_n may be less than or equal to the number of processors 580_1 through 580_m. In addition, the first through (m)th processors 580_1 through 580_m may correspond to separate processors or a plurality of cores of a multi-processor. In one example, the multi-processor may be referred to as a dual-core processor if m is 2, may be referred to as a quad-core processor if m is 4, etc.

The first through (n)th interrupt sources 520_1 through 520_n generate first through (n)th interrupts INT_R1 through INT_Rn, respectively. In this example, the first through (n)th interrupt sources 520_1 through 520_n are intellectual property (IP) blocks that perform specific operations in the multi-processor system (or the multi-core system). The first through (n)th interrupt sources 520_1 through 520_n may correspond to components of a system-on-chip (SOC) such as a video module, a sound module, a display module, a memory module, a communication module, a camera module, etc.

Still referring to FIG. 1, the interrupt controller 540 generates first through (m)th interrupt request signals nIRQ_I1 through nIRQ_Im based on the first through (n)th interrupts INT_R1 through INT_Rn from the first through (n)th interrupt sources 520_1 through 520_n, respectively.

The interrupt request signal spreader circuit 560 outputs first through (m)th interrupt request signals nIRQ_O1 through nIRQ_Om to the first through (m)th processors 580_1 through 580_m, respectively, based on the first through (m)th interrupt request signals nIRQ_I1 through nIRQ_Im and at time intervals that are greater than or equal to a time interval threshold. According to at least some example embodiments, the time interval threshold may be a given, desired or predetermined time interval determined according to empirical data or set by a user or design engineer. In at least one example embodiment, the time interval threshold may be a time interval in a range in which the in-rush currents are not generated in the processors when modes of the processors are changed (e.g., continuously changed) from an inactive state to an active state.

Still referring to FIG. 1, the first through (m)th processors 580_1 through 580_m perform interrupt handling operations for the first through (n)th interrupt sources 520_1 through 520_n in response to the first through (m)th interrupt request signals nIRQ_O1 through nIRQ_Om, respectively.

As mentioned above, the interrupt controller 540 generates the first through (m)th interrupt request signals nIRQ_I1 through nIRQ_Im based on the first through (n)th interrupts INT_R1 through INT_Rn generated by the first through (n)th interrupt sources 520_1 through 520_n. In at least one example embodiment, the interrupt controller 540 receives the first through (n)th interrupts INT_R1 through INT_Rn from the first through (n)th interrupt sources 520_1 through 520_n, and assigns the first through (n)th interrupts INT_R1 through INT_Rn to the first through (m)th processors 580_1 through 580_m. If the number of the first through (m)th processors 580_1 through 580_m is smaller than the number of the first through (n)th interrupt sources 520_1 through 520_m, then the interrupt controller 540 may assign the first through (n)th interrupts INT_R1 through INT_Rn to the first through (m)th processors 580_1 through 580_m by timely and/or spatially distributing the first through (n)th interrupts INT_R1 through INT_Rn.

The interrupt request signal spreader circuit 560 controls the time intervals between output of the first through (m)th interrupt request signals nIRQ_I1 through nIRQ_Im (e.g., a time interval between output of adjacent interrupt request signals) input from the interrupt controller 540 to be greater than or equal to the time interval threshold. In one example, the time interval threshold may be within a range in which in-rush currents are not generated in the first through (m)th processors 580_1 through 580_m when modes of the first through (m)th processors 580_1 through 580_m are changed (e.g., continuously changed) from an inactive state to an active state.

As will be discussed in more detail below with regard to FIG. 12, in at least one example embodiment the interrupt request signal spreader circuit 560 includes first through (m)th interrupt request signal holders and an interrupt request signal arbiter. In this example, the first through (m)th interrupt request signal holders receive the first through (m)th interrupt request signals nIRQ_I1 through nIRQ_Im, and output the first through (m)th interrupt request signals nIRQ_O1 through nIRQ_Om to the first through (m)th processors 580_1 through 580_m, respectively, at time intervals that are greater than or equal to the time interval threshold.

If necessary, the interrupt request signal arbiter controls the time interval between output of each of the first through (m)th interrupt request signals nIRQ_I1 through nIRQ_Im to be greater than or equal to the time interval threshold. For example, if a time interval between adjacent ones of the first through (m)th interrupt request signals nIRQ_I1 through nIRQ_Im is smaller than the time interval threshold, then the interrupt request signal arbiter controls the time interval between output of the adjacent interrupt request signals such that the time interval is greater than or equal to the time interval threshold.

As discussed herein, time intervals between (e.g., adjacent) interrupt request signals refers to time intervals between receipt of (e.g., adjacent) interrupt request signals at, for example, the interrupt request signal spreader circuit.

In one example, the first through (m)th interrupt request signals nIRQ_I1 through nIRQ_Im may be input to the first through (m)th interrupt request signal holders, respectively, and the first through (m)th interrupt request signal holders may be coupled to the first through (m)th processors 580_1 through 580_m, respectively. In one example embodiment, the first through (m)th interrupt request signal holders and the interrupt request signal arbiter may operate in about one clock domain. A request/acknowledge handshaking operation may be performed between the first through (m)th interrupt request signal holders and the interrupt request signal arbiter.

The interrupt request signal spreader circuit 560 may control time intervals between output of the first through (m)th interrupt request signals nIRQ_I1 through nIRQ_Im to be greater than or equal to the time interval threshold by delaying output of a (k+1)th interrupt request signal that follows a (k)th interrupt request signal (in this example, k is an integer greater than or equal to 1) until a (k)th time interval between the (k)th interrupt request signal and the (k+1)th interrupt request signal becomes at least the same or substantially the same as the time interval threshold (e.g., when the (k)th time interval is greater than 0). In addition, the interrupt request signal spreader circuit 560 may delay output of the (k)th interrupt request signal or output of the (k+1) interrupt request signal by the time interval threshold (e.g., when the (k)th time interval between the (k)th interrupt request signal and the (k+1)th interrupt request signal is equal or substantially equal to 0).

According to at least some example embodiments, the interrupt request signal spreader circuit 560 may change an output order for the first through (m)th interrupt request signals nIRQ_O1 through nIRQ_Om based on given, desired or predetermined priorities associated with the interrupts and/or interrupt request signals, so that an output order for the first through (m)th interrupt request signals nIRQ_O1 through nIRQ_Om is different from an input order for the first through (m)th interrupt request signals nIRQ_I1 through nIRQ_Im.

In at least some example embodiments, the interrupt request signal spreader circuit 560 may divide or group the first through (m)th processors 580_1 through 580_m into a first group including processors in an active state and a second group including processors in an inactive state. Then, among the first through (m)th interrupt request signals nIRQ_I1 through nIRQ_Im, the interrupt request signal spreader circuit 560 may not control time intervals between output of the interrupt request signals assigned to the first group to be at least the time interval threshold, but may control the time intervals between output of the interrupt request signals assigned to the second group to be at least the time interval threshold. By controlling time intervals between the first through (m)th interrupt request signals nIRQ_I1 through nIRQ_Im, which are generated based on the first through (n)th interrupts INT_R1 through INT_Rn, to be greater than or equal to the time interval threshold, the system-on-chip 500 may suppress and/or prevent modes of the first through (m)th processors 580_1 through 580_m from being changed (e.g., continuously changed) from an inactive state to an active state within a relatively small time window (sometimes referred to as a sudden wake-up) even when the interrupts are continuously generated by the interrupt sources 520_1 through

520_n within a relatively small time window. As a result, the system-on-chip 500 may achieve relatively high operational reliability by suppressing and/or preventing in-rush currents due to a sudden wake-up of a plurality of processors (or, a plurality of cores in a multi-core processor).

Figure 2:
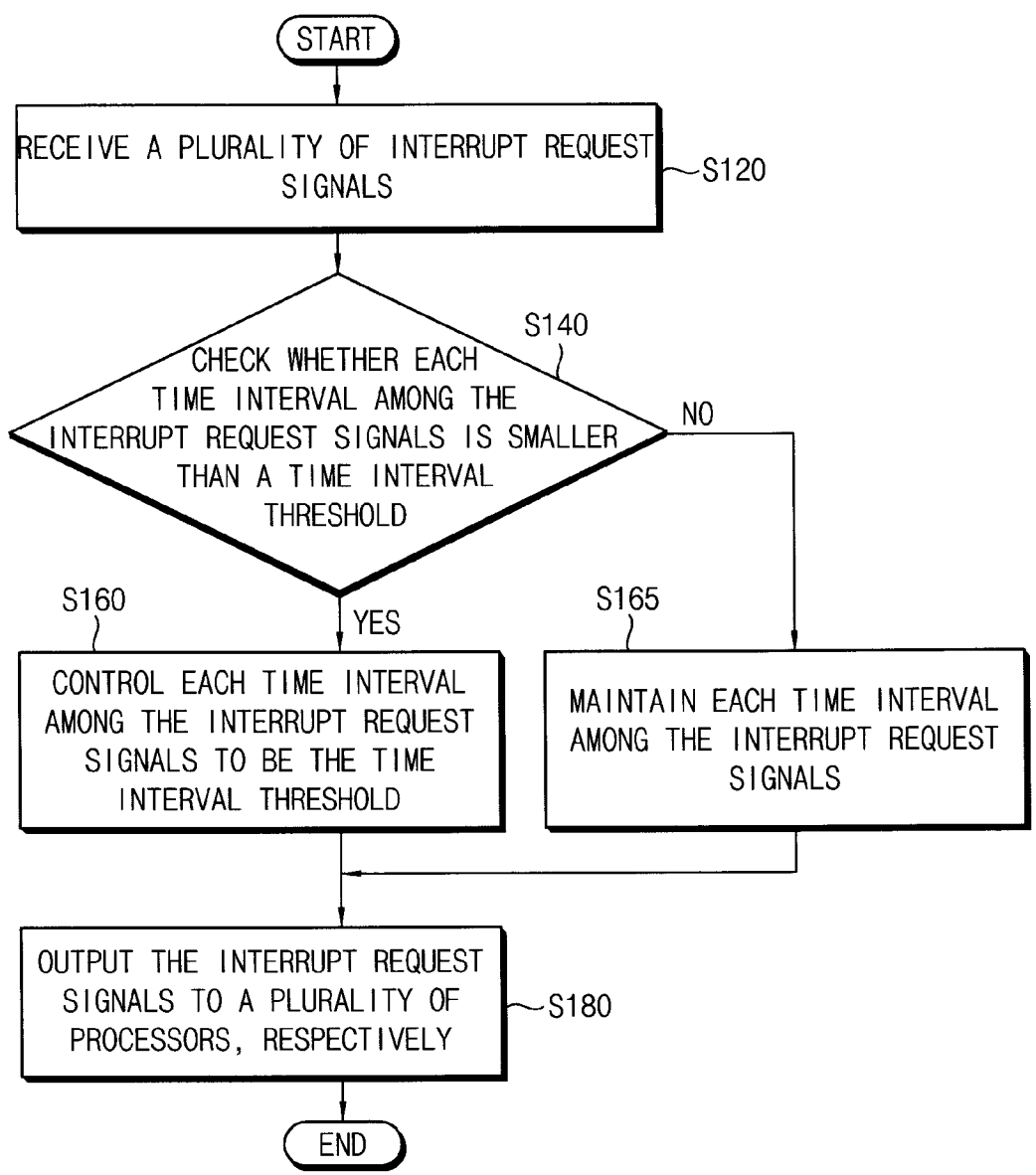
FIG. 2 is a flow chart illustrating a method of spreading a plurality of interrupt request signals according to an example embodiment.

FIG. 2 is a flow chart illustrating a method of spreading a plurality of interrupt request signals according to an example embodiment. For clarity, the method shown in FIG. 2 will be described with regard to the SOC shown in FIG. 1. However, it should be understood that example embodiments should not be limited to this implementation.

Referring to FIG. 2, at S120 the interrupt request signal spreader circuit 560 receives a plurality of interrupt request signals. At S140, the interrupt request signal spreader circuit 560 checks whether the time intervals between (e.g., receipt of) the interrupt request signals (e.g., time intervals between adjacent interrupt request signals) are smaller than a time interval threshold.

If a time interval between interrupt request signals is smaller than the time interval threshold, then the interrupt request signal spreader circuit 560 controls the time interval between output of the interrupt request signals to be greater than or equal to the time interval threshold at S160. The interrupt request signal spreader circuit 560 then outputs the interrupt request signals to a plurality of processors, respectively, at S180.

Returning to S140, if a time interval between the interrupt request signals is greater than or equal to the time interval threshold, then the interrupt request signal spreader circuit 560 maintains (e.g., does not adjust) the time interval between output of the interrupt request signals at S165. The interrupt request signal spreader circuit 560 then outputs the interrupt request signals to the plurality of processors, respectively, at S180.

According to at least some example embodiments, the processors may correspond to separate processors, or a plurality of cores in a multi-core processor (e.g., a dual-core processor, a quad-core processor, etc.). For convenience, the processors are described as being in an active state or an inactive state. However, it should be understood that the active state corresponds to a normal operation mode such as a power-on state, etc., and that the inactive state corresponds to a low-power mode such as a power-down state, a power-off state, etc. Hereinafter, the method shown in FIG. 2 will be described in more detail with regard to the SOC shown in FIG. 1.

Referring to FIGS. 1 and 2, as mentioned above the interrupt request signal spreader circuit 560 sequentially receives the interrupt request signals at S120. The interrupt request signals may be generated based on a plurality of interrupts output from a plurality of interrupt sources, and may be assigned to respective processors. In this example, the interrupt sources are intellectual property (IP) blocks that perform specific operations in the multi-core system (or the multi-processor system). The interrupt sources may correspond to components of a system-on-chip (SOC) such as a video module, a sound module, a display module, a memory module, a communication module, a camera module, etc. When the interrupts are generated by the interrupt sources, the interrupt request signals may be generated based on the interrupts, and then provided to respective processors. The processors may then perform interrupt handling operations in response to the interrupt request signals, respectively. Recently, SOCs have been more widely used for electric devices as electric devices become smaller and lighter. As described above, a SOC may include a plurality of IP blocks and a plurality of processors or a processor having a plurality of cores. In this example, the processors may more frequently enter a low-power mode to reduce power consumption, and may wake-up from the low-power mode in response to receiving respective interrupt request signals. When processors substantially wake-up from the low-power mode at the same or substantially the same time (sometimes referred to as a sudden wake-up), in-rush currents may be caused in the processors. The in-rush currents may cause electric devices having SOCs to malfunction. As sizes of SOCs become smaller, it is relatively difficult for the SOCs to achieve relatively high operational reliability because in-rush currents are also caused by dynamic current changes in the SOC.

Returning to FIG. 2, in response to receiving the interrupt request signals, the interrupt request signal spreader circuit 560 checks whether the time intervals between the interrupt request signals are smaller than the time interval threshold at S140. As mentioned above, in at least one example embodiment, the time interval threshold may be determined to be within a range in which the in-rush currents are not generated in the processors when modes of the processors are continuously changed from an inactive state to an active state.

If a time interval between interrupt request signals is smaller than the time interval threshold, then the interrupt request signal spreader circuit 560 controls the time interval between output of the interrupt request signals to be at least equal to the time interval threshold at S160.

In more detail, at S160 the interrupt request signal spreader circuit 560 controls the time interval to be at least equal to the time interval threshold by delaying output of a (k+1)th interrupt request signal that follows a (k)th interrupt request signal (where k is an integer greater than or equal to 1) until a (k)th time interval between the (k)th interrupt request signal and the (k+1)th interrupt request signal becomes at least the same or substantially the same as the time interval threshold when the (k)th time interval is greater than 0 (non-zero). In this example, the (k)th interrupt request signal and the (k+1)th interrupt request signal are adjacent (e.g., consecutive or sequentially input).

For example, two processors may sequentially wake-up within a relatively small time window (sometimes referred to as a sudden wake-up), and as a result, in-rush currents may be caused in two processors if the (k)th interrupt request signal and the (k+1)th interrupt request signal are output to the two processors without controlling the (k)th time interval when the (k)th time interval is smaller than the time interval threshold. Thus, the interrupt request signal spreader circuit 560 controls the (k)th time interval between the (k) th interrupt request signal and the (k+1)th interrupt request signal to be the time interval threshold by delaying output of the (k+1)th interrupt request signal that follows the (k) th interrupt request signal.

In addition, the interrupt request signal spreader circuit 560 delays output of the (k)th interrupt request signal or the (k+1) interrupt request signal by at least the time interval threshold when the (k)th time interval between the (k)th interrupt request signal and the (k+1)th interrupt request signal is equal or substantially equal to 0 (the interrupt request signals are concurrently or simultaneously input). As a result, in-rush currents may be suppressed and/or prevented in two processors because the (k)th time interval is controlled to be at least the time interval threshold by using the method of FIG. 2 when the (k)th interrupt request signal and the (k+1)th interrupt request signal are input at the same or substantially the same time.

According to at least some example embodiments, the interrupt request signal spreader circuit 506 may change an output order of the interrupt request signals based on given, desired or predetermined priorities associated with the interrupts and/or interrupt request signals when a time interval between the interrupt request signals is controlled to be greater than or equal to the time interval threshold.

For example, assume that a (k)th interrupt request signal, a (k+1)th interrupt request signal, and a (k+2) interrupt request signal are sequentially input in that order. If a (k)th time interval between the (k)th interrupt request signal and the (k+1) interrupt request signal and a (k+1)th time interval between the (k+1)th interrupt request signal and the (k+2)th interrupt request signal are smaller than the time interval threshold, then the interrupt request signal spreader circuit 560 controls the (k)th time interval to be greater than or equal to the time interval threshold by delaying output of the (k+1)th interrupt request signal that follows the (k)th interrupt request signal, and then controls the (k+1)th time interval to be greater than or equal to the time interval threshold by delaying output of the (k+2)th interrupt request signal that follows the (k+1)th interrupt request signal. However, in at least some example embodiments, the interrupt request signal spreader circuit 560 may change an output order of the (k)th interrupt request signal, the (k+1)th interrupt request signal, and the (k+2)th interrupt request signal based on given, desired or predetermined priorities of the interrupts.

For example, assume that the (k)th interrupt request signal, the (k+1)th interrupt request signal, and the (k+2) interrupt request signal are sequentially input, and that the (k)th interrupt request signal has the highest priority and the (k+1) interrupt request signal has the lowest priority. In this case, if a (k)th time interval between the (k)th interrupt request signal and the (k+1) interrupt request signal and a (k+1)th time interval between the (k+1)th interrupt request signal and the (k+2)th interrupt request signal are smaller than the time interval threshold, then the interrupt request signal spreader circuit 560 sequentially outputs the (k)th interrupt request signal, the (k+2)th interrupt request signal, and the (k+1)th interrupt request signal in that order based on given, desired or predetermined priorities of the interrupts and/or interrupt request signals.

Generally, when a processor receives an interrupt request signal, a mode of the processor changes from an inactive state to an active state. Then, the processor performs interrupt handling operations (or interrupt services) in response to the interrupt request signal corresponding to an interrupt generated by an interrupt source. Here, in-rush currents may result because a plurality of transistors included in the processor suddenly operate. In particular, a low-power processor may include a plurality of clock gating circuits in order to reduce consumption power in an inactive state. Hence, most clocks do not toggle in an inactive state. When a mode of the processor is changed from an inactive state to an active state, in-rush currents may result because most clocks toggle concurrently or simultaneously. Further, in the case of a system-on-chip having a plurality of processors, when the processors wake-up from the low-power mode at the same or substantially the same time (sometimes referred to as a sudden wake-up), all in-rush currents caused in the processors are added so that the in-rush currents may cause an electric device having the SOC to malfunction.

By controlling time intervals between output of a plurality of interrupt request signals to be greater than or equal to the time interval threshold, the method of FIG. 2 may suppress and/or prevent modes of a plurality of processors (or a plurality of cores in a multi-core processor) from being continuously changed from an inactive state to an active state within a relatively small time even when the interrupts are continuously generated by a plurality of interrupt sources within a relatively small time window. As a result, a SOC employing the method of FIG. 2 may achieve relatively high operational reliability by suppressing and/or preventing in-rush currents due to the sudden wake-up of a plurality of processors (or a plurality of cores in a multi-core processor). According to at least some example embodiments, the method of FIG. 2 may be performed for a plurality of interrupt request signals input to a plurality of processors in an inactive state.

Returning to FIG. 2, the interrupt request signal spreader circuit 560 then outputs the interrupt request signals to a plurality of processors, respectively, at S180.

Returning to S140 in FIG. 2, if a time interval between the interrupt request signals is greater than the time interval threshold, then the interrupt request signal spreader circuit 560 maintains (does not adjust) that time interval between output the interrupt request signals at S165. The interrupt request signal spreader circuit 560 then outputs the interrupt request signals to a plurality of processors, respectively, at S180.

According to at least the example embodiment shown in FIG. 2, the interrupt request signal spreader circuit 560 outputs the interrupt request signals to the processors, respectively, by controlling a time interval between output of interrupt request signals to be at least equal to the time interval threshold if the time interval among the interrupt request signals is smaller than the time interval threshold. The interrupt request signal spreader circuit 560 outputs the interrupt request signals to the processors, respectively, without controlling (or adjusting) the time intervals if the time interval between the interrupt request signals is greater than or equal to the time interval threshold. As a result, the interrupt request signals may be provided to the processors, respectively, at a time interval that is greater than or equal to the time interval threshold.

Figure 3A:
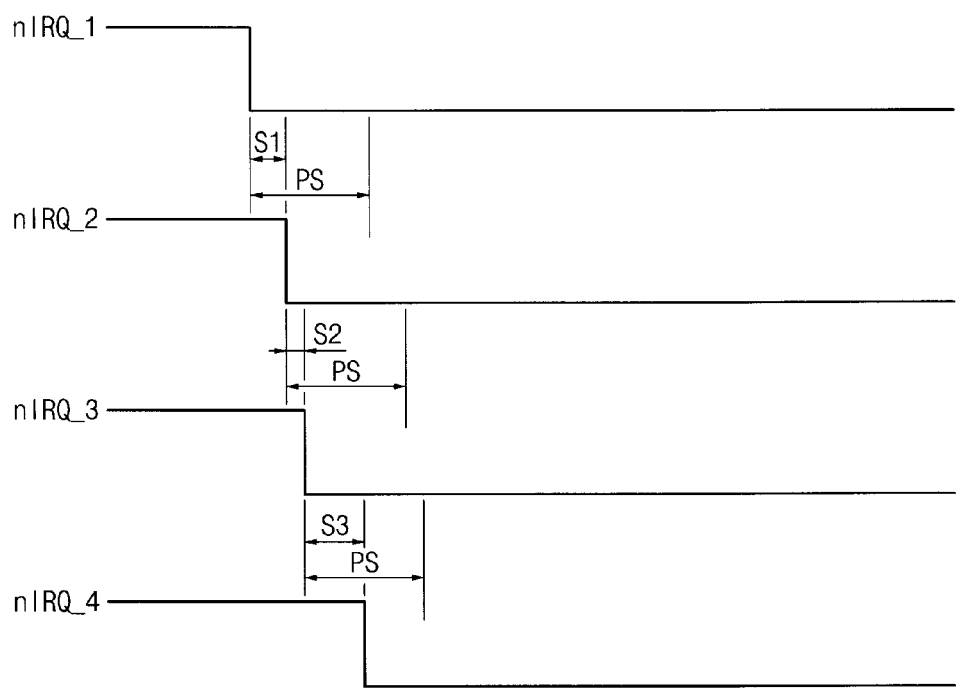
FIGS. 3A and 3B are diagrams illustrating an example in which a plurality of interrupt request signals are spread according to the method of FIG. 2.
Figure 3B:
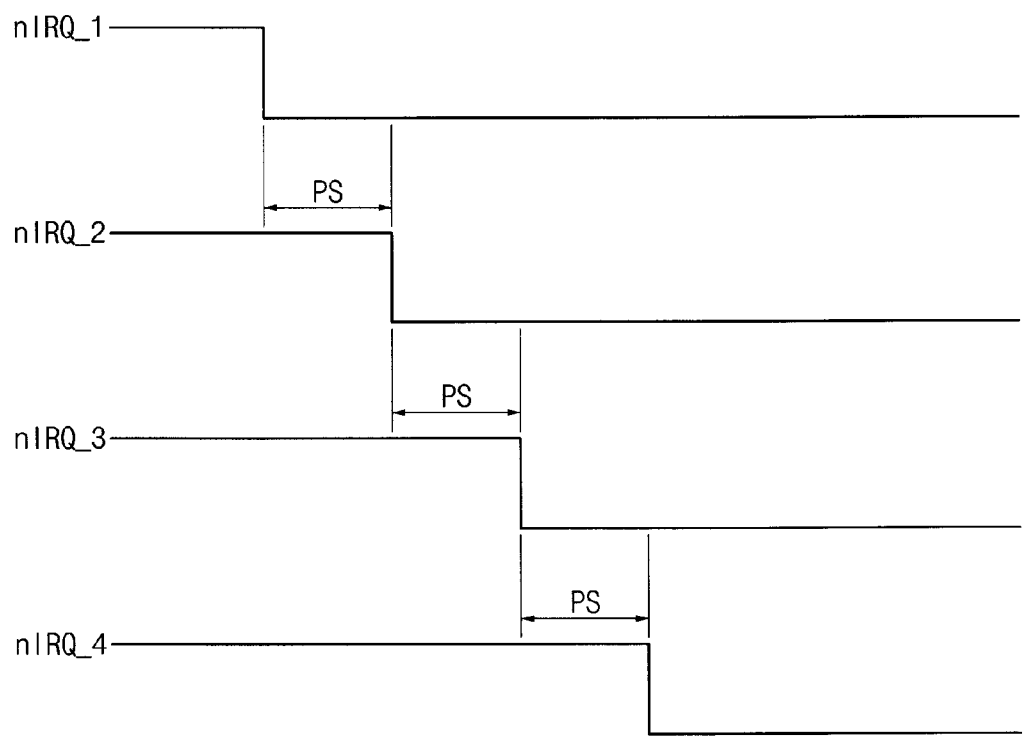

FIGS. 3A and 3B are diagrams illustrating an example in which a plurality of interrupt request signals are spread according to the method of FIG. 2. FIG. 3A shows an example in which first through fourth interrupt request signals nIRQ_1 through nIRQ_4 are sequentially input, and FIG. 3B shows an example in which the first through fourth interrupt request signals nIRQ_1 through nIRQ_4 are sequentially output to first through fourth processors, respectively, according to the method of FIG. 2.

As illustrated in FIG. 3A, a first time interval S1 between the first interrupt request signal nIRQ_1 and the second interrupt request signal nIRQ_2 is smaller than a time interval threshold PS, a second time interval S2 between the second interrupt request signal nIRQ_2 and the third interrupt request signal nIRQ_3 is smaller than the time interval threshold PS, and a third time interval S3 between the third interrupt request signal nIRQ_3 and the fourth interrupt request signal nIRQ_4 is also smaller than the time interval threshold PS.

As illustrated in FIG. 3B, output of the second interrupt request signal nIRQ_2 is delayed such that the first time interval 51 is at least equal or substantially equal to the time interval threshold PS. In addition, output of the third interrupt request signal nIRQ_3 is delayed such that the second time interval S2 is at least equal or substantially equal to the time interval threshold PS. Further, output of the fourth interrupt request signal nIRQ_4 is delayed such that the third time interval S3 is at least equal or substantially equal to the time interval threshold PS. As described above, the first through fourth interrupt request signals nIRQ_1 through nIRQ_4 may be sequentially output to the first through fourth processors, respectively, at time intervals corresponding to the time interval threshold PS.

Figure 4A:
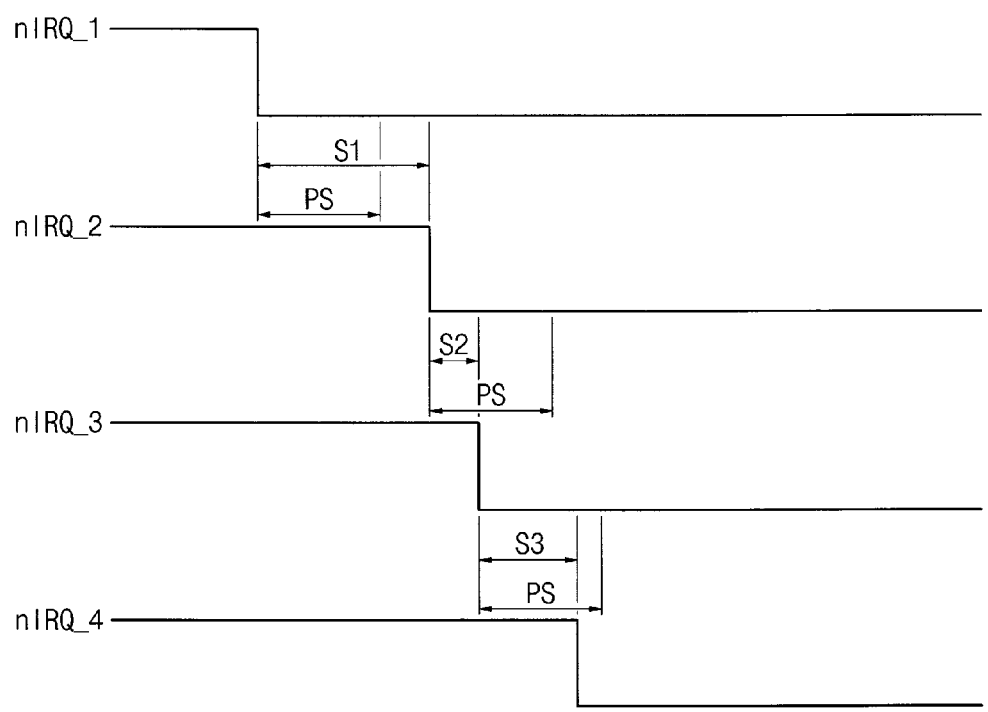
FIGS. 4A and 4B are diagrams illustrating another example in which a plurality of interrupt request signals are spread according to the method of FIG. 2.
Figure 4B:
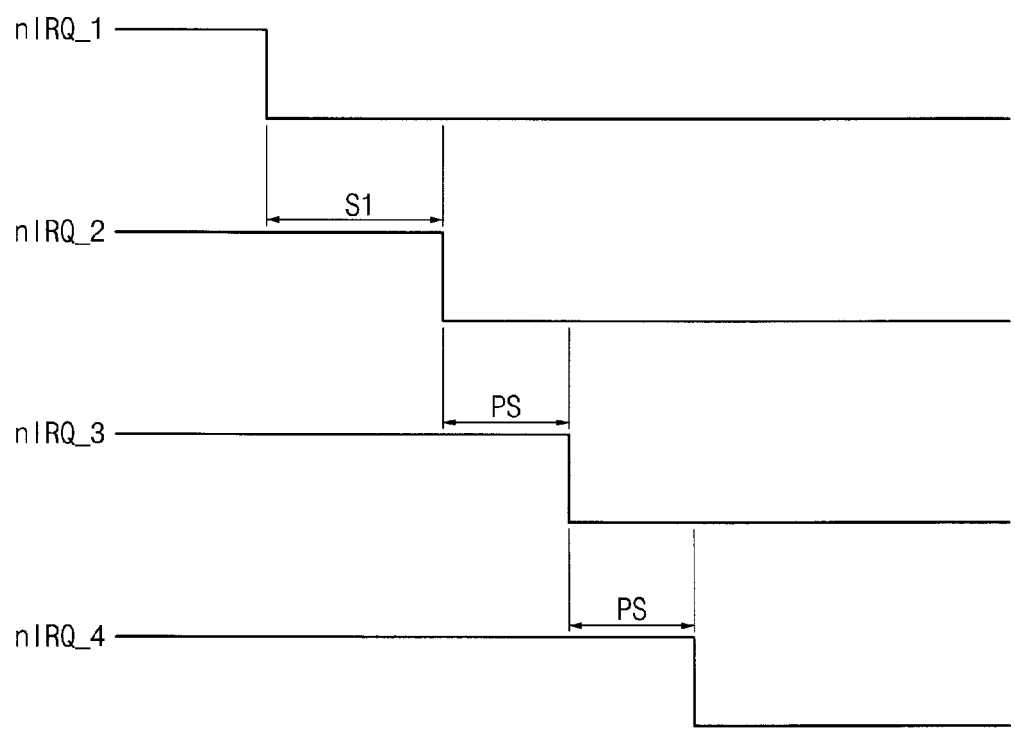

FIGS. 4A and 4B are diagrams illustrating another example in which a plurality of interrupt request signals are spread according to the method of FIG. 2. FIG. 4A shows an example in which first through fourth interrupt request signals nIRQ_1 through nIRQ_4 are sequentially input, and FIG. 4B shows an example in which the first through fourth interrupt request signals nIRQ_1 through nIRQ_4 are sequentially output to first through fourth processors, respectively, according to the method of FIG. 2.

In more detail, as illustrated in FIG. 4A, a first time interval 51 between the first interrupt request signal nIRQ_1 and the second interrupt request signal nIRQ_2 is greater than a time interval threshold PS, a second time interval S2 between the second interrupt request signal nIRQ_2 and the third interrupt request signal nIRQ_3 is smaller than the time interval threshold PS, and a third time interval S3 between the third interrupt request signal nIRQ_3 and the fourth interrupt request signal nIRQ_4 is also smaller than the time interval threshold PS.

As illustrated in FIG. 4B, according to the method of FIG. 2, the first time interval S1 between the first interrupt request signal nIRQ_1 and the second interrupt request signal nIRQ_2 is maintained and not adjusted, whereas output of the third interrupt request signal nIRQ_3 is delayed such that the second time interval S2 is greater than or equal to the time interval threshold PS, and output of the fourth interrupt request signal nIRQ_4 is delayed such that the third time interval S3 is greater than or equal to the time interval threshold PS. The first through fourth interrupt request signals nIRQ_1 through nIRQ_4 are output sequentially to the first through fourth processors, respectively, at time intervals that are greater than or equal to the time interval threshold PS.

Figure 5A:
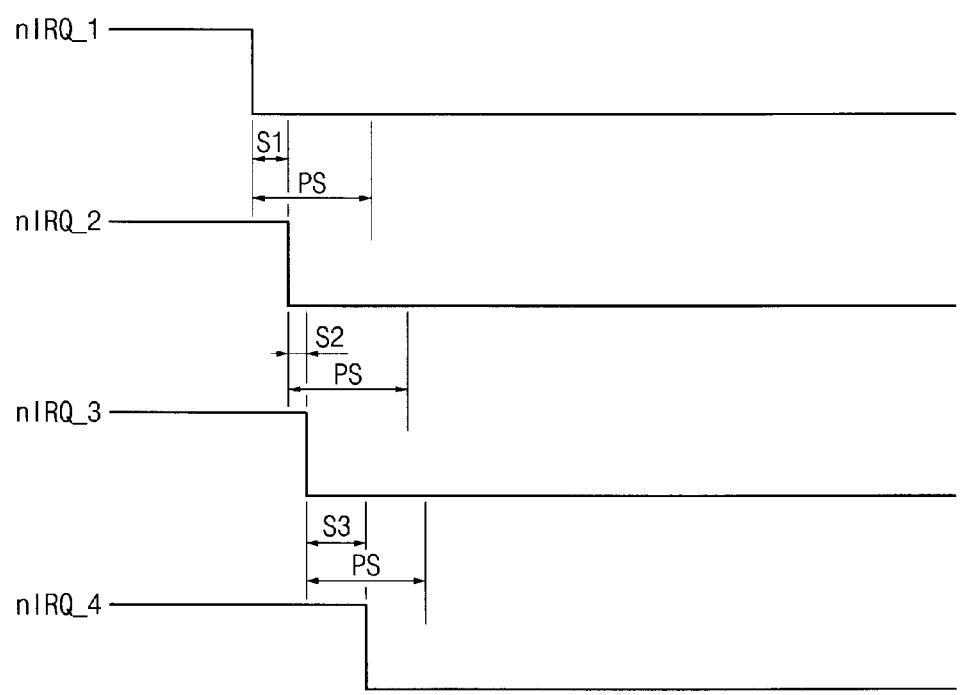
FIGS. 5A and 5B are diagrams illustrating still another example in which a plurality of interrupt request signals are spread according to the method of FIG. 2.
Figure 5B:
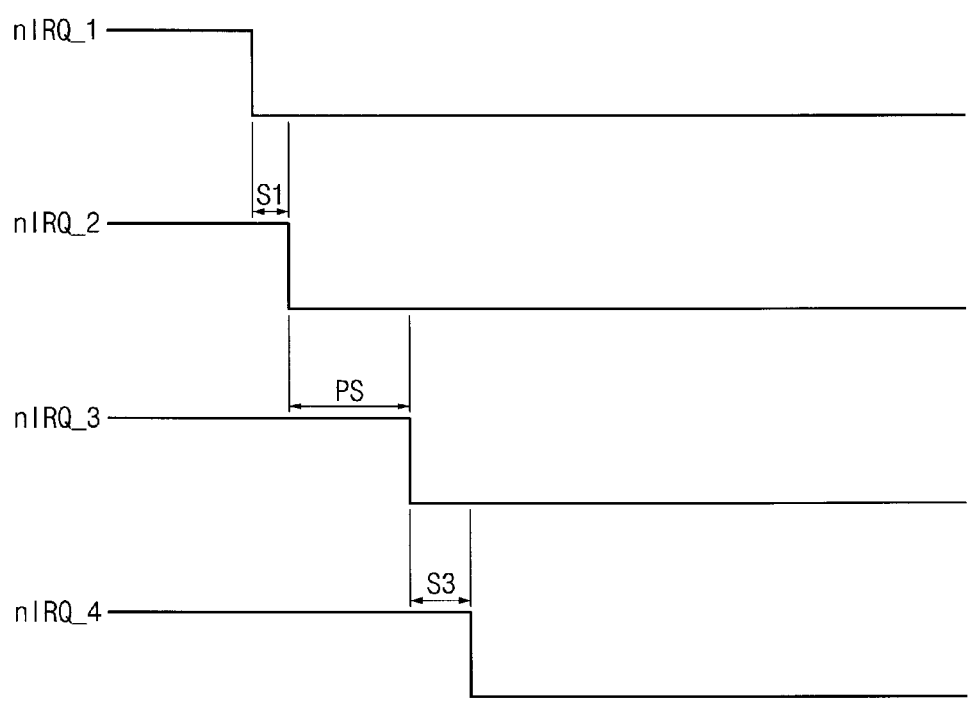

FIGS. 5A and 5B are diagrams illustrating still another example in which a plurality of interrupt request signals are spread according to the method of FIG. 2. FIG. 5A shows an example in which first through fourth interrupt request signals nIRQ_1 through nIRQ_4 are sequentially input, and FIG. 5B shows an example in which the first through fourth interrupt request signals nIRQ_1 through nIRQ_4 are sequentially output to first through fourth processors, respectively, according to the method of FIG. 2.

As illustrated in FIG. 5A, a first time interval S1 between the first interrupt request signal nIRQ_1 and the second interrupt request signal nIRQ_2 is smaller than a time interval threshold PS, a second time interval S2 between the second interrupt request signal nIRQ_2 and the third interrupt request signal nIRQ_3 is smaller than the time interval threshold PS, and a third time interval S3 between the third interrupt request signal nIRQ_3 and the fourth interrupt request signal nIRQ_4 is also smaller than the time interval threshold PS.

According to performance of a SOC in an electric device, in-rush currents may not be caused in two processors even when two processors wakeup simultaneously or concurrently, or sequentially within a relatively small time window, whereas in-rush currents may be caused in three processors when three processors wake-up simultaneously or concurrently, or sequentially within a relatively small time window.

As illustrated in FIGS. 5A and 5B, according to the method of FIG. 2, two processors may be allowed to sequentially wake-up within a relatively small time window, but more than two processors may not. For example, as shown in FIGS. 5A and 5B, the first time interval 51 between the first interrupt request signal nIRQ_1 and the second interrupt request signal nIRQ_2 is maintained (not adjusted) even though the first time interval 51 is smaller than the time interval threshold PS. In this example, a given, desired or predetermined number of processors (e.g., two processors) are allowed to sequentially wake-up within a relatively small time window. However, output of the third interrupt request signal nIRQ_3 is delayed such that the second time interval S2 is greater than or equal to the time interval threshold PS. Consequently, according to the method of FIG. 2, three processors are suppressed and/or prevented from sequentially waking-up within a relatively small time window. Then, as shown in FIG. 5B, the third time interval S3 between the third interrupt request signal nIRQ_3 and the fourth interrupt request signal nIRQ_4 is maintained and not adjusted even though the third time interval S3 is smaller than the time interval threshold PS.

Figure 6:
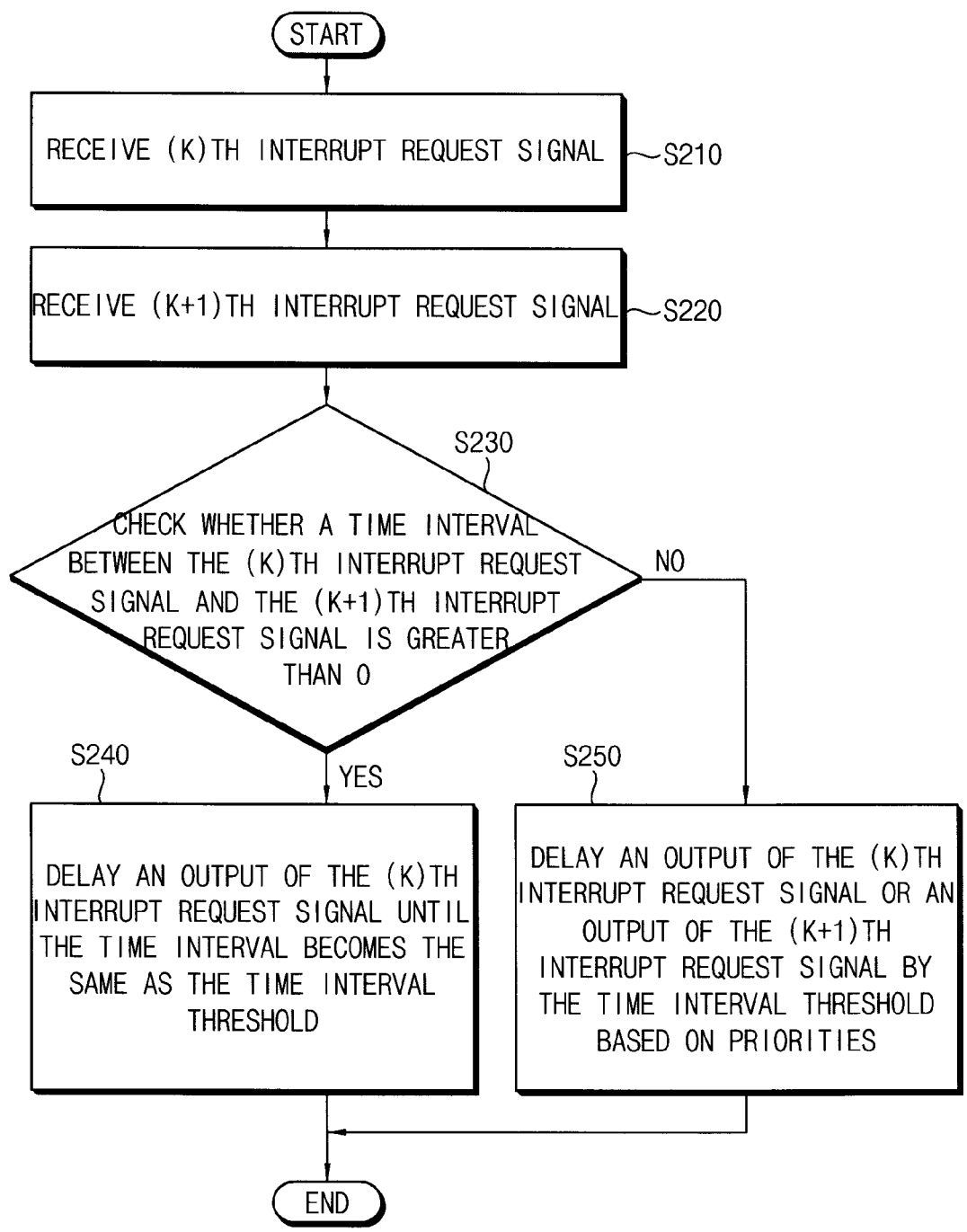
FIG. 6 is a flow chart illustrating a method of spreading a plurality of interrupt request signals according to another example embodiment.

FIG. 6 is a flow chart illustrating a method of spreading a plurality of interrupt request signals according to another example embodiment. As with FIG. 2, for clarity the method shown in FIG. 6 will be described with regard to the SOC shown in FIG. 1. However, it should be understood that example embodiments should not be limited to this implementation.

Referring to FIG. 6, the interrupt request signal spreader circuit 560 receives a (k) th interrupt request signal at S210, and then receives a (k+1)th interrupt request signal at S220.

At S230, the interrupt request signal spreader circuit 560 checks whether a time interval between the (k)th interrupt request signal and the (k+1)th interrupt request signal is greater than 0.

If the time interval between the (k)th interrupt request signal and the (k+1)th interrupt request signal is greater than 0, then the interrupt request signal spreader circuit 560 delays output of the (k)th interrupt request signal at S240 until the time interval becomes at least the same or substantially the same as the time interval threshold.

Returning to S230, if a time interval between the (k)th interrupt request signal and the (k+1)th interrupt request signal is equal to 0, then at S250 the interrupt request signal spreader circuit 560 delays output of the (k)th interrupt request signal or output of the (k+1)th interrupt request signal by at least the time interval threshold based on given, desired or predetermined priorities associated with the interrupts and/or interrupt request signals.

Generally, the (k)th interrupt request signal and the (k+1)th interrupt request signal are sequentially input so that a time interval between the (k)th interrupt request signal and the (k+1)th interrupt request signal is greater than 0. However, according to at least some example embodiments, the (k)th interrupt request signal and the (k+1)th interrupt request signal may be input at the same or substantially the same time (e.g., simultaneously or concurrently). In this example, the interrupt request signal spreader circuit 560 checks whether a time interval between the (k)th interrupt request signal and the (k+1)th interrupt request signal is greater than 0.

If a time interval between the (k)th interrupt request signal and the (k+1)th interrupt request signal is greater than 0, but less than the time interval threshold, then the interrupt request signal spreader circuit 560 delays output of the (k)th interrupt request signal until the time interval becomes at least the same or substantially the same as the time interval threshold.

On the other hand, if a time interval between the (k)th interrupt request signal and the (k+1)th interrupt request signal is equal to 0, then the interrupt request signal spreader circuit 560 delays output of the (k)th interrupt request signal or output of the (k+1)th interrupt request signal by at least the time interval threshold based on the given, desired or predetermined priorities associated with the interrupts and/or interrupt request signals. As a result, the (k)th interrupt request signal and the (k+1)th interrupt request signal are output to a (k)th processor and a (k+1)th processor, respectively, at a time interval corresponding to at least the time interval threshold even when the (k)th interrupt request signal and the (k+1)th interrupt request signal are input at the same or substantially the same time (e.g., simultaneously or concurrently). Thus, the method of FIG. 6 may suppress and/or prevent modes of a plurality of processors included in a SOC from continuously being changed from an inactive state to an active state within a relatively small time window (sometimes referred to as a sudden wake-up).

Figure 7A:
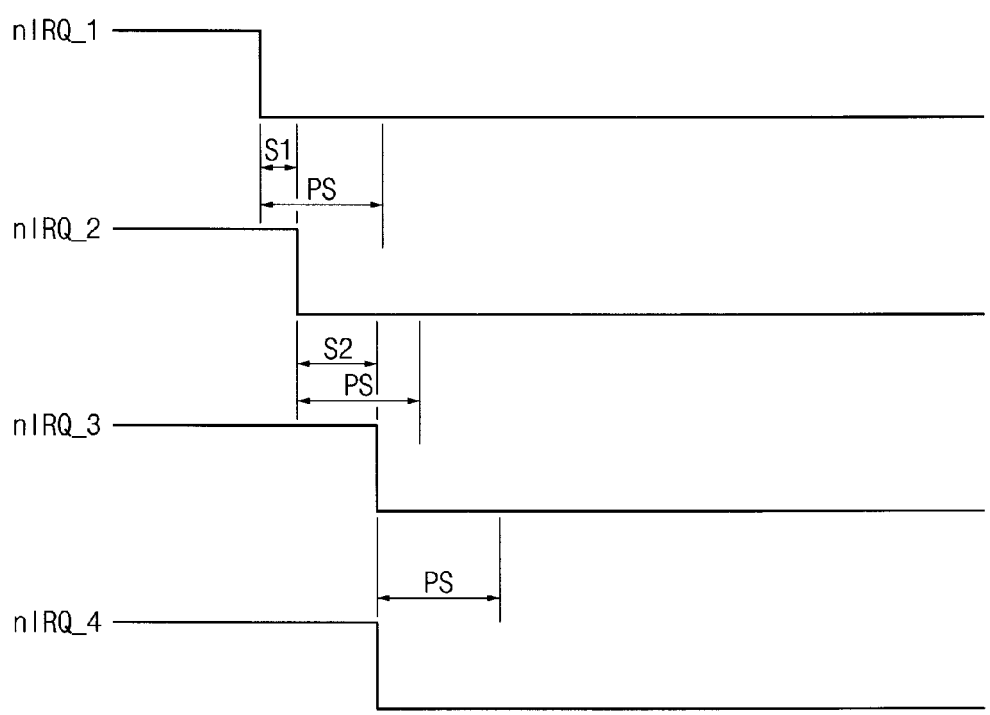
FIGS. 7A and 7B are diagrams illustrating an example in which a plurality of interrupt request signals are spread according to the method of FIG. 6.
Figure 7B:
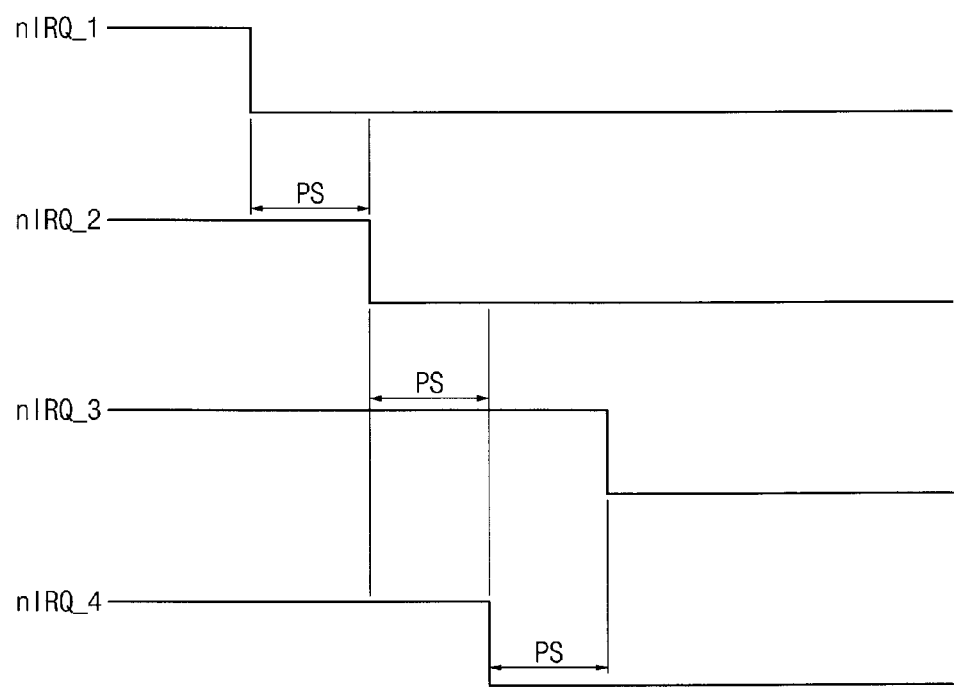

FIGS. 7A and 7B are diagrams illustrating an example in which a plurality of interrupt request signals are spread according to the method of FIG. 6. FIG. 7A shows an example in which first through fourth interrupt request signals nIRQ_1 through nIRQ_4 are sequentially input, and FIG. 7B shows an example in which the first through fourth interrupt request signals nIRQ_1 through nIRQ_4 are sequentially output to first through fourth processors, respectively, according to the method of FIG. 6.

In the example shown in FIG. 7A, adjacent interrupt request signals nIRQ_3 and nIRQ_4 are input at the same or substantially the same time (e.g., simultaneously or concurrently), whereas the interrupt request signals nIRQ_1 and nIRQ_2 are input sequentially. A first time interval S1 between the first interrupt request signal nIRQ_1 and the second interrupt request signal nIRQ_2 is smaller than a time interval threshold PS, a second time interval S2 between the second interrupt request signal nIRQ_2 and the third interrupt request signal nIRQ_3 (or, the fourth interrupt request signal nIRQ_4) is smaller than the time interval threshold PS, and a time interval between the third interrupt request signal nIRQ_3 and the fourth interrupt request signal nIRQ_4 is equal or substantially equal to 0.

As illustrated in FIG. 7B, it is assumed that a priority of the fourth interrupt request signal nIRQ_4 is higher than a priority of the third interrupt request signal nIRQ_3. Output of the second interrupt request signal nIRQ_2 is delayed such that the first time interval 51 between the first interrupt request signal nIRQ_1 and the second interrupt request signal nIRQ_2 is greater than or equal to the time interval threshold PS. In addition, output of the fourth interrupt request signal nIRQ_4 is delayed such that the second time interval S2 between the second interrupt request signal nIRQ_2 and the fourth interrupt request signal nIRQ_4 is greater than or equal to the time interval threshold PS. Further, output of the third interrupt request signal nIRQ_3 is delayed by the time interval threshold PS after output of the fourth interrupt request signal nIRQ_4.

In the example shown in FIGS. 7A and 7B, the fourth interrupt request signal nIRQ_4 is output prior to the third interrupt request signal nIRQ_3 because a priority of the fourth interrupt request signal nIRQ_4 is higher than a priority of the third interrupt request signal nIRQ_3. The first through fourth interrupt request signals nIRQ_1 through nIRQ_4 are output to the first through fourth processors, respectively, at time intervals corresponding to the time interval threshold PS based on given, desired or predetermined priorities when adjacent interrupt request signals (e.g., the third interrupt request signal nIRQ_3 and the fourth interrupt request signal nIRQ_4) are input at the same or substantially the same time (e.g., simultaneously or concurrently).

Figure 8:
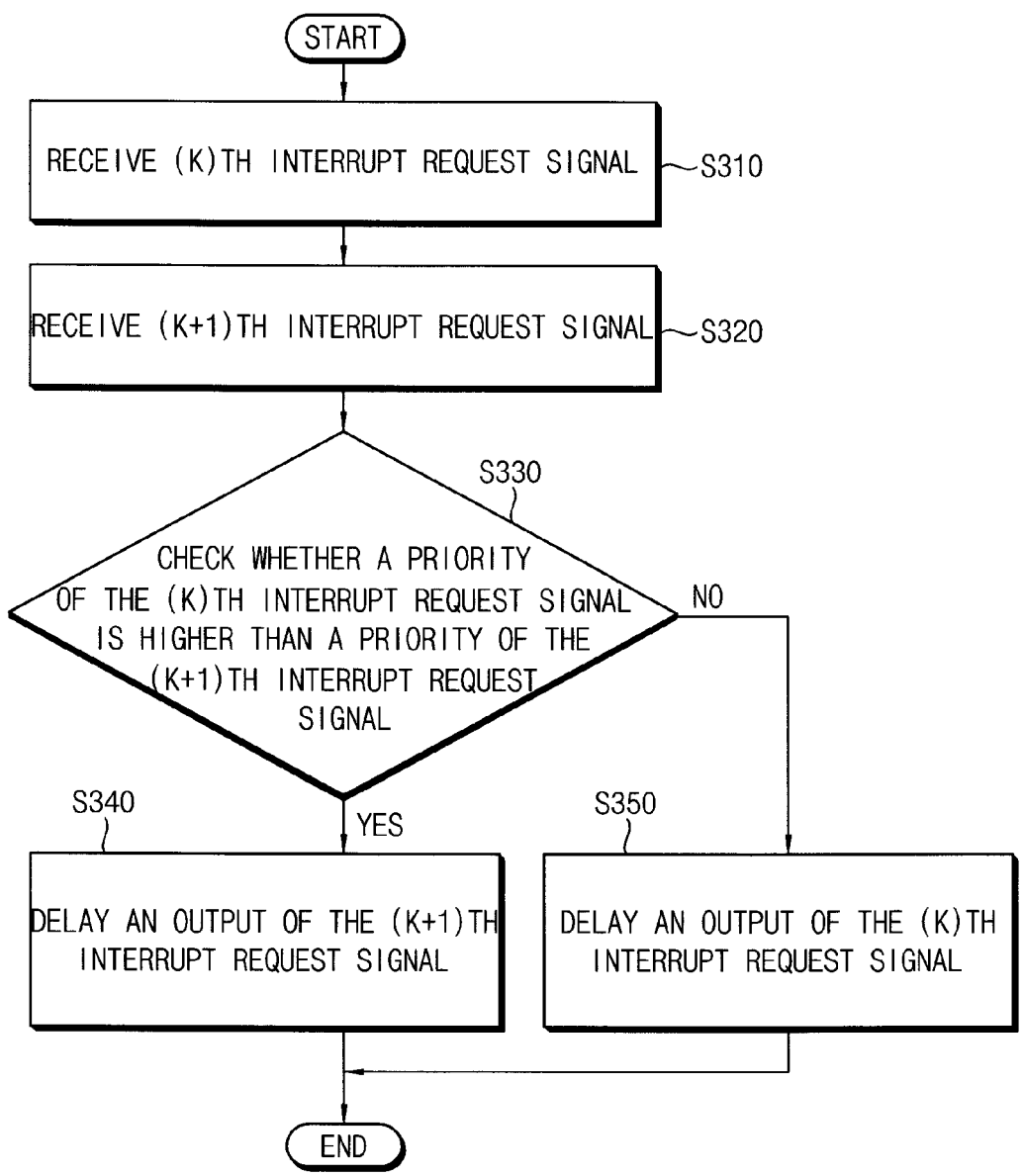
FIG. 8 is a flow chart illustrating a method of spreading a plurality of interrupt request signals according to another example embodiment.

FIG. 8 is a flow chart illustrating a method of spreading a plurality of interrupt request signals according to another example embodiment. As with FIG. 2, for clarity the method shown in FIG. 8 will be described with regard to the SOC shown in FIG. 1. However, it should be understood that example embodiments should not be limited to this implementation.

Referring to FIG. 8, the interrupt request signal spreader circuit 560 receives a (k)th interrupt request signal at S310, and then receives a (k+1)th interrupt request signal at S320. Although this example embodiment is described with regard to the (k)th interrupt request signal and the (k+1)th interrupt request signal being received sequentially, example embodiments may be equally applicable to interrupt request signals received concurrently or simultaneously.

The interrupt request signal spreader circuit 560 then checks whether a priority of the (k)th interrupt request signal is higher than a priority of the (k+1)th interrupt request signal at S330.

If the priority of the (k)th interrupt request signal is higher than the priority of the (k+1)th interrupt request signal, then the interrupt request signal spreader circuit 560 delays output of the (k+1)th interrupt request signal at S340.

Returning to S330, if a priority of the (k)th interrupt request signal is lower than the priority of the (k+1)th interrupt request signal, then the interrupt request signal spreader circuit 560 delays output of the (k)th interrupt request signal at S350.

In the example embodiment shown in FIG. 8, it is assumed that a time interval between the (k)th interrupt request signal and the (k+1)th interrupt request signal is smaller than the time interval threshold.

In accordance with the method of FIG. 8, the interrupt request signal spreader circuit 560 may sequentially receive the (k)th interrupt request signal and the (k+1)th interrupt request signal, and check whether a time interval between the (k)th interrupt request signal and the (k+1)th interrupt request signal is smaller than the time interval threshold. The interrupt request signal spreader circuit 560 also checks whether a priority of the (k) th interrupt request signal is higher than a priority of the (k+1)th interrupt request signal. Then, the interrupt request signal spreader circuit 560 determines an output order for the (k) th interrupt request signal and the (k+1)th interrupt request signal based on given, desired or predetermined priorities associated with the interrupt request signals, regardless or independent of an input order for the (k)th interrupt request signal and the (k+1)th interrupt request signal.

In more detail, for example, the interrupt request signal spreader circuit 560 delays output of the (k+1)th interrupt request signal when a priority of the (k)th interrupt request signal is higher than a priority of the (k+1)th interrupt request signal. On the other hand, the interrupt request signal spreader circuit 560 delays output of the (k)th interrupt request signal when a priority of the (k)th interrupt request signal is lower than a priority of the (k+1)th interrupt request signal. As a result, the (k)th interrupt request signal and the (k+1)th interrupt request signal are output to a (k)th processor and a (k+1)th processor, respectively, at a time interval corresponding to at least the time interval threshold based on given, desired or predetermined priorities. Thus, the method of FIG. 8 may suppress and/or prevent modes of a plurality of processors included in a SOC from continuously being changed from an inactive state to an active state within a relatively small time period (sometimes referred to as a sudden wake-up).

Figure 9A:
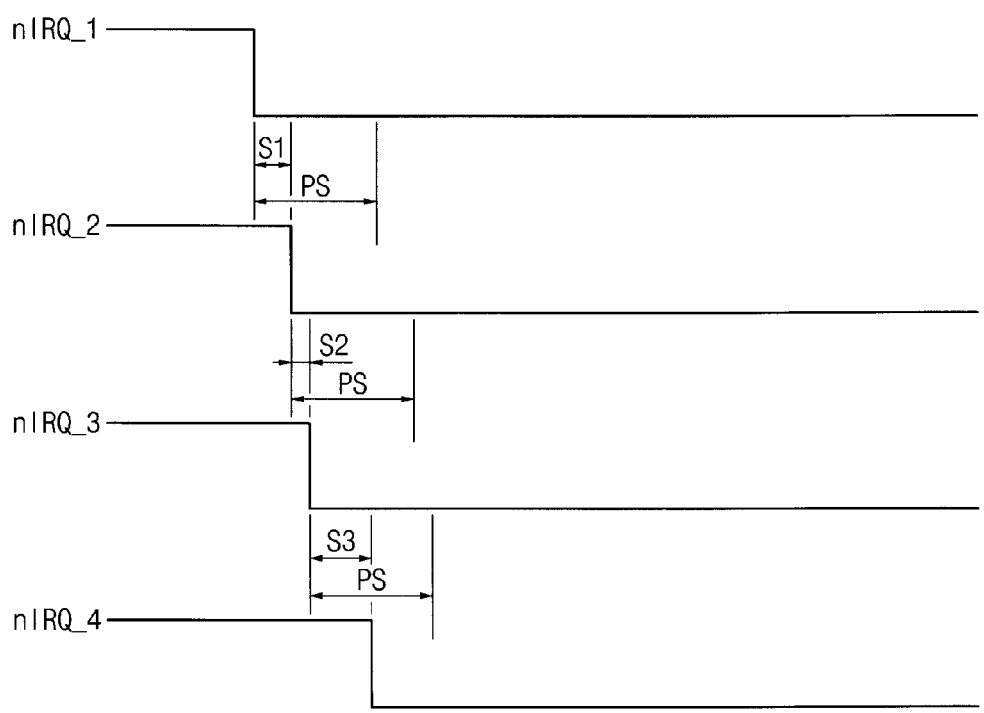
FIGS. 9A and 9B are diagrams illustrating an example in which a plurality of interrupt request signals are spread according to the method of FIG. 8.
Figure 9B:
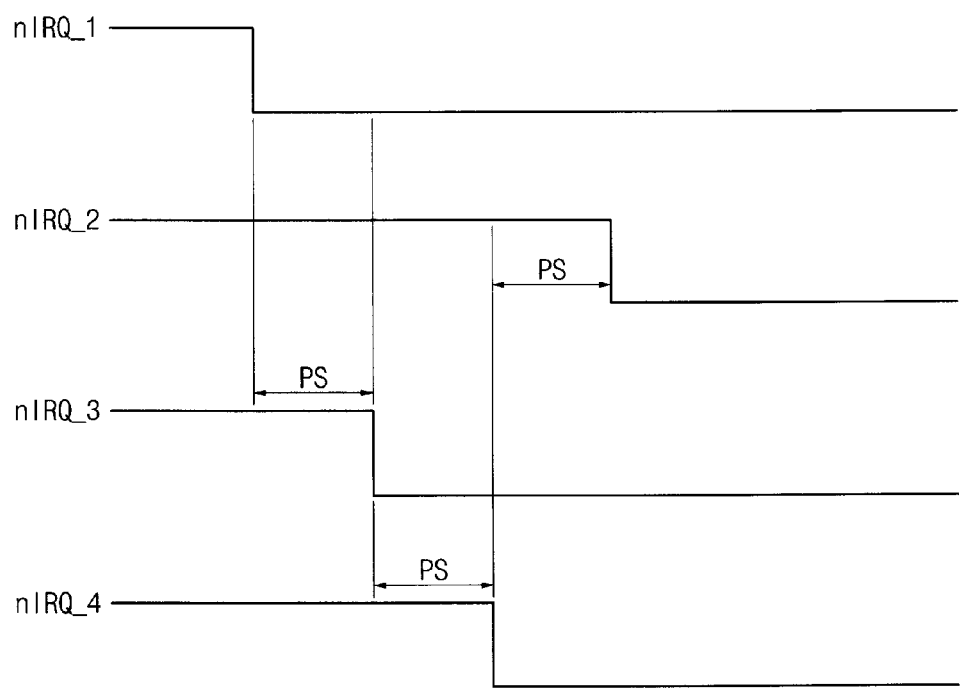

FIGS. 9A and 9B are diagrams illustrating an example in which a plurality of interrupt request signals are spread according to the method of FIG. 8. FIG. 9A shows an example in which first through fourth interrupt request signals nIRQ_1 through nIRQ_4 are sequentially input, and FIG. 9B shows an example in which the first through fourth interrupt request signals nIRQ_1 through nIRQ_4 are output to first through fourth processors, respectively, based on given, desired or predetermined priorities according to the method of FIG. 8.

As illustrated in FIG. 9A, a first time interval S1 between the first interrupt request signal nIRQ_1 and the second interrupt request signal nIRQ_2 is smaller than a time interval threshold PS, a second time interval S2 between the second interrupt request signal nIRQ_2 and the third interrupt request signal nIRQ_3 is smaller than the time interval threshold PS, and a third time interval S3 between the third interrupt request signal nIRQ_3 and the fourth interrupt request signal nIRQ_4 is smaller than the time interval threshold PS. In at least one example embodiment, according to required conditions for a SOC in an electric device, an output order for the first through fourth interrupt request signals nIRQ_1 through nIRQ_4 may need to be different from an input order for the first through fourth interrupt request signals nIRQ_1 through nIRQ_4. Hence, an output order for the first through fourth interrupt request signals nIRQ_1 through nIRQ_4 may be changed based on given, desired or predetermined priorities associated with the interrupt request signals nIRQ_1 through nIRQ_4.

By utilizing the method of FIG. 8, a wake-up order for first through fourth processors that perform interrupt handling operations in response to the first through fourth interrupt request signals nIRQ_1 through nIRQ_4 may be adjusted by changing an output order for the first through fourth interrupt request signals nIRQ_1 through nIRQ_4 based on the given, desired or predetermined priorities.

As illustrated in FIG. 9B, the interrupt request signal spreader circuit outputs first interrupt request signal nIRQ_1, the third interrupt request signal nIRQ_3, the fourth interrupt request signal nIRQ_4, and the second interrupt request signal nIRQ_2 based on the given, desired or predetermined priorities, regardless or independent of an input order of the first through fourth interrupt request signals nIRQ_1 through nIRQ_4. Meanwhile, the time intervals between the first interrupt request signal nIRQ_1, the third interrupt request signal nIRQ_3, the fourth interrupt request signal nIRQ_4, and the second interrupt request signal nIRQ_2 are controlled to be greater than or equal to the time interval threshold PS. As a result, the first through fourth interrupt request signals nIRQ_1 through nIRQ_4 are output to first through fourth processors, respectively, at a time interval corresponding to at least the time interval threshold PS based on the given, desired or predetermined priorities.

Figure 11:
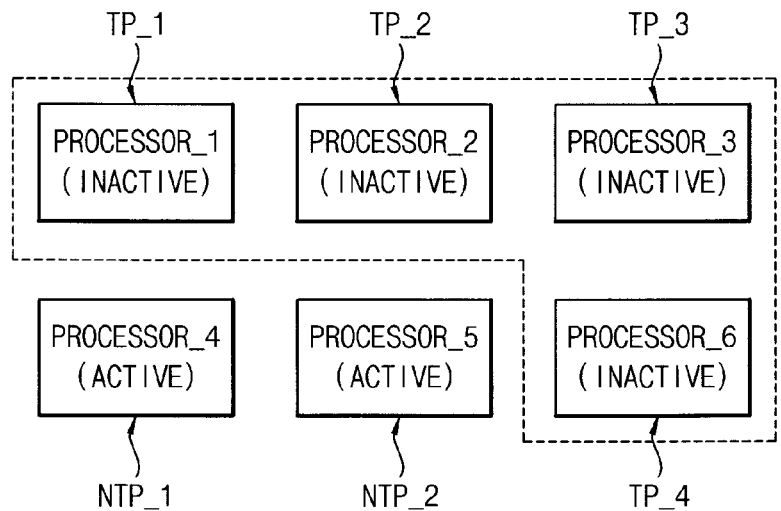
FIG. 11 is a diagram illustrating a plurality of processors in an active state and a plurality of processors in an inactive state.

FIG. 10 is a flow chart illustrating a method of spreading a plurality of interrupts according to another example embodiment, and FIG. 11 is a diagram illustrating a plurality of processors in an active state and a plurality of processors in an inactive state. The method shown in FIG. 10 will be described with regard to the SOC shown in FIG. 1 and the processors shown in FIG. 11.

Referring to FIGS. 1, 10 and 11, at S410 the interrupt request signal spreader circuit 560 sequentially receives a plurality of interrupt request signals. At S420, the interrupt request signal spreader circuit 560 divides or groups the interrupt request signals into target interrupt request signals and non-target interrupt request signals.

According to at least this example embodiment, the target interrupt request signals are interrupt request signals assigned to (e.g., scheduled to be output to) processors TP_1 through TP_4 in an inactive state, whereas the non-target interrupt request signals are interrupt request signals assigned to processors NTP_1 and NTP_2 in an active state.

Returning to FIG. 10, at S430 the interrupt request signal spreader circuit 560 immediately outputs the non-target interrupt request signals to the processors NTP_1 and NTP_2 in an active state, respectively. Meanwhile, the interrupt request signal spreader circuit 560 checks whether the time intervals between the target interrupt request signals (e.g., time intervals between adjacent target interrupt request signals) are smaller than a time interval threshold at S440.

If a time interval between target interrupt request signals is smaller than the time interval threshold, then the interrupt request signal spreader circuit 560 controls a time interval between output of the target interrupt request signals to be greater than or equal to the time interval threshold at S450. The interrupt request signal spreader circuit 560 then outputs the target interrupt request signals to the processors TP_1 through TP_4 in an inactive state, respectively, at S480.

Returning to S440, if a time interval between target interrupt request signals is greater than or equal to the time interval threshold, then the interrupt request signal spreader circuit 560 maintains (does not adjust) the time interval between output of the target interrupt request signals at S460. The interrupt request signal spreader circuit 560 then outputs the target interrupt request signals to the processors TP_1 through TP_4 in an inactive state, respectively, at S480.

According to the method of FIG. 10, time intervals between the non-target interrupt request signals are not controlled because the processors NTP_1 and NTP_2 are in an active state and need not wake-up. However, time intervals between target interrupt request signals assigned to the processors TP_1 through TP_4 in the inactive state are controlled to be greater than or equal to the time interval threshold. As a result, a SOC employing the method of FIG. 10 may operate at higher speeds because the number of interrupt request signals (e.g., loads) being handled is reduced.

Figure 12:
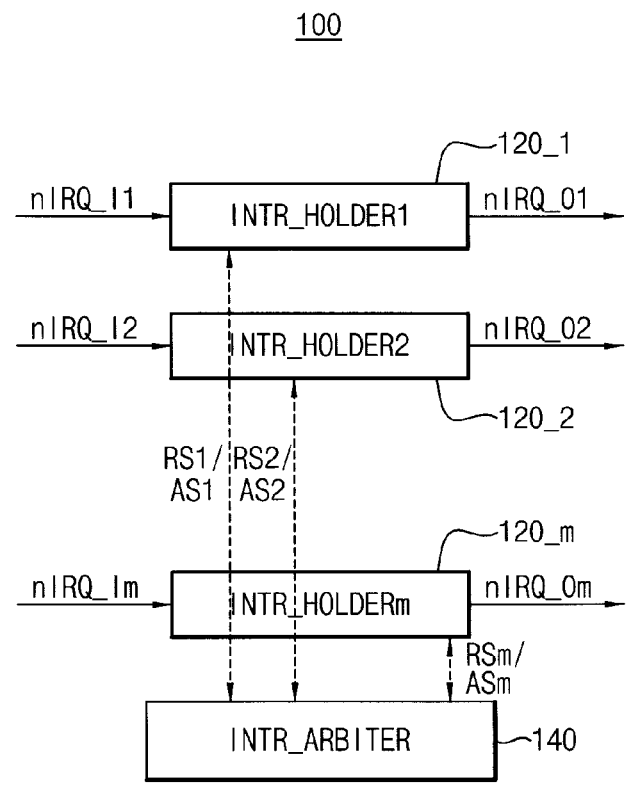
FIG. 12 is a block diagram illustrating an interrupt request signal spreader circuit according to an example embodiment.

FIG. 12 is a block diagram illustrating an interrupt request signal spreader circuit according to an example embodiment. The interrupt request signal spreader circuit shown in FIG. 12 may serve as the interrupt request signal spreader circuit 560 shown in FIG. 1.

Referring to FIG. 12, the interrupt request signal spreader circuit 100 includes an interrupt request signal arbiter 140 and first through (m)th interrupt request signal holders 120_1 through 120_m. In this example, m is an integer greater than or equal to 2.

The first through (m)th interrupt request signal holders 120_1 through 120_m are configured to receive first through (m)th interrupt request signals nIRQ_I1 through nIRQ_Im, respectively, and to output first through (m)th interrupt request signals nIRQ_O1 through nIRQ_Om to first through (m)th processors (not illustrated in FIG. 12), respectively, at time intervals greater than or equal to a time interval threshold.

The first through (m)th interrupt request signals nIRQ_I1 through nIRQ_Im are generated based on a plurality of interrupts output from a plurality of interrupt sources (not illustrated in FIG. 12). In addition, the first through (m)th interrupt request signals nIRQ_I1 through nIRQ_Im are input to the first through (m)th interrupt request signal holders 120_1 through 120_m, respectively. Meanwhile, the first through (m)th interrupt request signal holders 120_1 through 120_m are coupled to the first through (m)th processors, respectively. In addition, the first through (m)th interrupt request signal holders 120_1 through 120_m output the first through (m)th interrupt request signals nIRQ_O1 through nIRQ_Om to the first through (m)th processors, respectively, at time intervals greater than or equal to the time interval threshold.

In more detail with regard to FIG. 12, when the first through (m)th interrupt request signal holders 120_1 through 120_m receive the first through (m)th interrupt request signals nIRQ_I1 through nIRQ_Im, respectively, the first through (m)th interrupt request signal holders 120_1 through 120_m send respective output-request signals RS1 through RSm to the interrupt request signal arbiter 140. When the first through (m)th interrupt request signal holders 120_1 through 120_m receive respective output-acknowledge signals AS1 through ASm from the interrupt request signal arbiter 140, the first through (m)th interrupt request signal holders 120_1 through 120_m output the first through (m)th interrupt request signals nIRQ_O1 through nIRQ_Om to the first through (m)th processors, respectively.

For this operation, each of the first through (m)th interrupt request signal holders 120_1 through 120_m may be implemented by a state machine having an idle-state, a wait-state, and an assert-state. An example state machine implementation will be described in more detail below with regard to FIG. 13.

The interrupt request signal arbiter 140 is configured to control time intervals between output of the first through (m)th interrupt request signals (e.g., a time interval between output of adjacent interrupt request signals) to be greater than or equal to a time interval threshold when the time intervals between the first through (m)th interrupt request signals are smaller than the time interval threshold. In this example, the time interval threshold may be a given, desired or predetermined time interval within a range in which in-rush currents are not caused in the first through (m)th processors when modes of the processors are continuously changed from an inactive state to an active state.

Still referring to FIG. 12, the interrupt request signal arbiter 140 receives the output-request signals RS1 through RSm from the first through (m)th interrupt request signal holders 120_1 through 120_m, respectively. Then, the interrupt request signal arbiter 140 controls the first through (m)th interrupt request signal holders 120_1 through 120_m to output the first through (m)th interrupt request signals nIRQ_O1 through nIRQ_Om to the first through (m)th processors, respectively, at time intervals that are greater than or equal to the time interval threshold by outputting the output-acknowledge signals AS1 through ASm to the first through (m)th interrupt request signal holders 120_1 through 120_m, respectively, at time intervals that are greater than or equal to the time interval threshold. For this operation, the interrupt request signal arbiter 140 may be implemented by a state machine having an idle-state and a wait-state. An example state machine implementation will be described in more detail below with regard to FIG. 14.

In at least one example embodiment, the interrupt request signal arbiter 140 may change an output order of the first through (m)th interrupt request signals nIRQ_O1 through nIRQ_Om based on given, desired or predetermined priorities associated with the interrupt request signals nIRQ_O1 through nIRQ_Om. As a result, an input order of the first through (m)th interrupt request signals nIRQ_I1 through nIRQ_Im that are input to the first through (m)th interrupt request signal holders 120_1 through 120_m may be different from an output order of the first through (m)th interrupt request signals nIRQ_O1 through nIRQ_Om that are output from the first through (m)th interrupt request signal holders 120_1 through 120_m.

In at least one example embodiment, the interrupt request signal arbiter 140 may divide or group the first through (m)th processors into a first group including processors in an active state and a second group including processors in an inactive state. Among the first through (m)th interrupt request signals nIRQ_I1 through nIRQ_Im, the interrupt request signal arbiter 140 may not control time intervals between interrupt request signals assigned to the first group to be the time interval threshold, but may control each time interval among interrupt request signals assigned to the second group to be greater than or equal to the time interval threshold.

As described above, by controlling time intervals between output a plurality of interrupt request signals, which are generated based on a plurality of interrupts, to be greater than or equal to the time interval threshold, the interrupt request signal spreader circuit 100 may suppress and/or prevent modes of a plurality of processors (or a plurality of cores in a multi-core processor) from being continuously changed from an inactive state to an active state within a relatively small time period (sometimes referred to as a sudden wake-up) even when the interrupts are continuously generated by a plurality of interrupt sources within a relatively small time window. As a result, a SOC including the interrupt request signal spreader circuit 100 may achieve relatively high operational reliability by suppressing and/or preventing the in-rush currents due to a sudden wake-up of a plurality of processors (or a plurality of cores in a multi-core processor).

Figure 13:
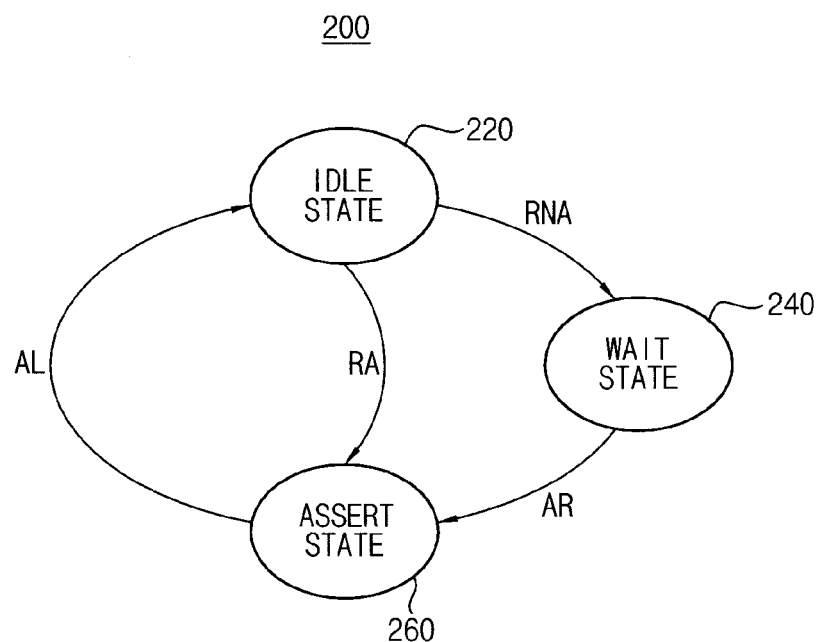
FIG. 13 is a diagram illustrating a state machine implementation of the interrupt request signal holder shown in FIG. 12.

FIG. 13 is a diagram illustrating an example state machine implementation of the interrupt request signal holder shown in FIG. 12. One or more of the first through (m) th interrupt request signal holders 120_1 through 120_m may be implemented by a state machine such as that shown in FIG. 13. However, example embodiments are not limited to this implementation. For the sake of clarity, FIG. 13 will be described with regard to the (n)th interrupt request signal holder 120_n and the (n)th interrupt request signal nIRQ_In. However, it should be understood that each of the first through (m)th interrupt request signal holders 120_1 through 120_m may operate in the same or substantially the same manner.

Referring to FIG. 13, the state machine 200 includes an idle-state 220, a wait-state 240, and an assert-state 260. The idle-state 220 indicates that the interrupt request signal holder 120_n has not received the interrupt request signal nIRQ_In. The wait-state 240 indicates that the interrupt request signal holder 120_n is waiting for the output-acknowledge signal ASn from the interrupt request signal arbiter 140. The assert-state 260 indicates that the interrupt request signal holder 120_n has output or is outputting the interrupt request signal nIRQ_Onto the (n) the processor 580_n. In this example, the idle-state 220 corresponds to a default-state for the interrupt request signal holder 120_n.

In more detail with regard to FIG. 13, the first through (m)th interrupt request signal holders 120_1 through 120_m stay in the idle-state 220 until receiving the first through (m)th interrupt request signals nIRQ_I1 through nIRQ_Im, respectively. In response to receiving the first through (m)th interrupt request signals nIRQ_I1 through nIRQ_Im, the first through (m)th interrupt request signal holders 120_1 through 120_m enter the wait-state 240 or the assert-state 260.

For example, when the interrupt request signal holder 120_n receives an interrupt request signal nIRQ_In, the interrupt request signal holder 120_n sends an output-request signal RSn to the interrupt request signal arbiter 140. If the interrupt request signal arbiter 140 outputs an output-acknowledge signal ASn to the interrupt request signal holder 120_n immediately, then the interrupt request signal holder 120_n enters the assert-state 260 (RA). However, if the interrupt request signal arbiter 140 does not output an output-acknowledge signal ASn to the interrupt request signal holder 120_n immediately, then the interrupt request signal holder 120_n enters the wait-state 240 (RNA). In this case, the interrupt request signal arbiter 140 delays output of the output-acknowledge signal ASn to control a time interval between output of interrupt request signals (e.g., a time interval between output of adjacent interrupt request signals).

Subsequently, the interrupt request signal holder 120_n receives the output-acknowledge signal ASn from the interrupt request signal arbiter 140 while in the wait-state 240. In response to the output-acknowledge signal ASn, the interrupt request signal holder 120_n enters the assert-state 260 (AR).

After the interrupt request signal holder 120_n outputs the interrupt request signal nIRQ_On to the (n)th processor while in the assert-state 260, the interrupt request signal holder 120_n returns to the idle-state 220 (AL). As described above, each of the first through (m)th interrupt request signal holders 120_1 through 120_m may be implemented by a state machine having a relatively simple structure.

Figure 14:
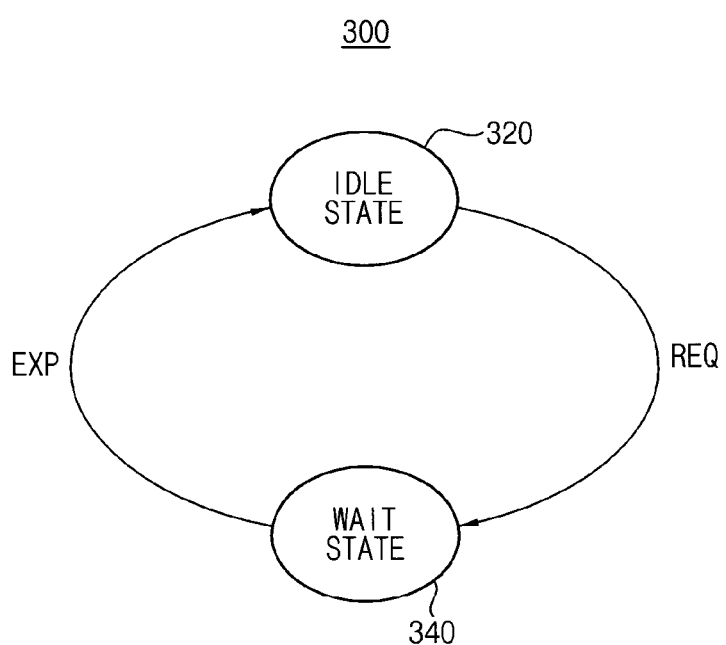
FIG. 14 is a diagram illustrating a state machine implementation of the interrupt request signal arbiter shown in FIG. 12.

FIG. 14 is a diagram illustrating an example state machine implementation of the interrupt request signal arbiter shown in FIG. 12.

Referring to FIG. 14, the state machine 300 includes an idle-state 320 and a wait-state 340. The idle-state 320 indicates that none of the first through (m)th interrupt request signals nIRQ_O1 through nIRQ_Om is being output to the first through (m) th processors. The wait-state 340 indicates that at least one of the first through (m)th interrupt request signals nIRQ_O1 through nIRQ_Om is being output to the first through (m) th processors. In this example, the idle-state 320 corresponds to a default-state for the interrupt request signal arbiter 140.

The interrupt request signal arbiter 140 may remain in the idle-state 320 until receiving any of the output-request signals RS1 through RSm from the first through (m) th interrupt request signal holders 120_1 through 120_m. In response to receiving an output request signal (e.g., RSn from the interrupt request signal holder 120_n), the interrupt request signal arbiter 140 enters the wait-state 340 (REQ), and immediately outputs an output-acknowledge signal ASn to the interrupt request signal holder 120_n. The interrupt request signal arbiter 140 remains in the wait-state 340 during a given, desired or predetermined time interval (e.g., the time interval threshold). Then, the interrupt request signal arbiter 140 returns to the idle-state 320 (EXP). According to at least this example embodiment, while the interrupt request signal arbiter 140 is in the wait-state 340, the interrupt request signal arbiter 140 does not output other output-acknowledge signals to other interrupt request signal holders even when other interrupt request signal holders send their output-request signals to the interrupt request signal arbiter 140. As a result, the first through (m)th interrupt request signals nIRQ_O1 through nIRQ_Om are output to the first through (m)th processors, respectively, at time intervals that are greater than or equal to the time interval threshold. As described above, the interrupt request signal arbiter 140 may be implemented by a state machine having a relatively simple structure.

Figure 15:
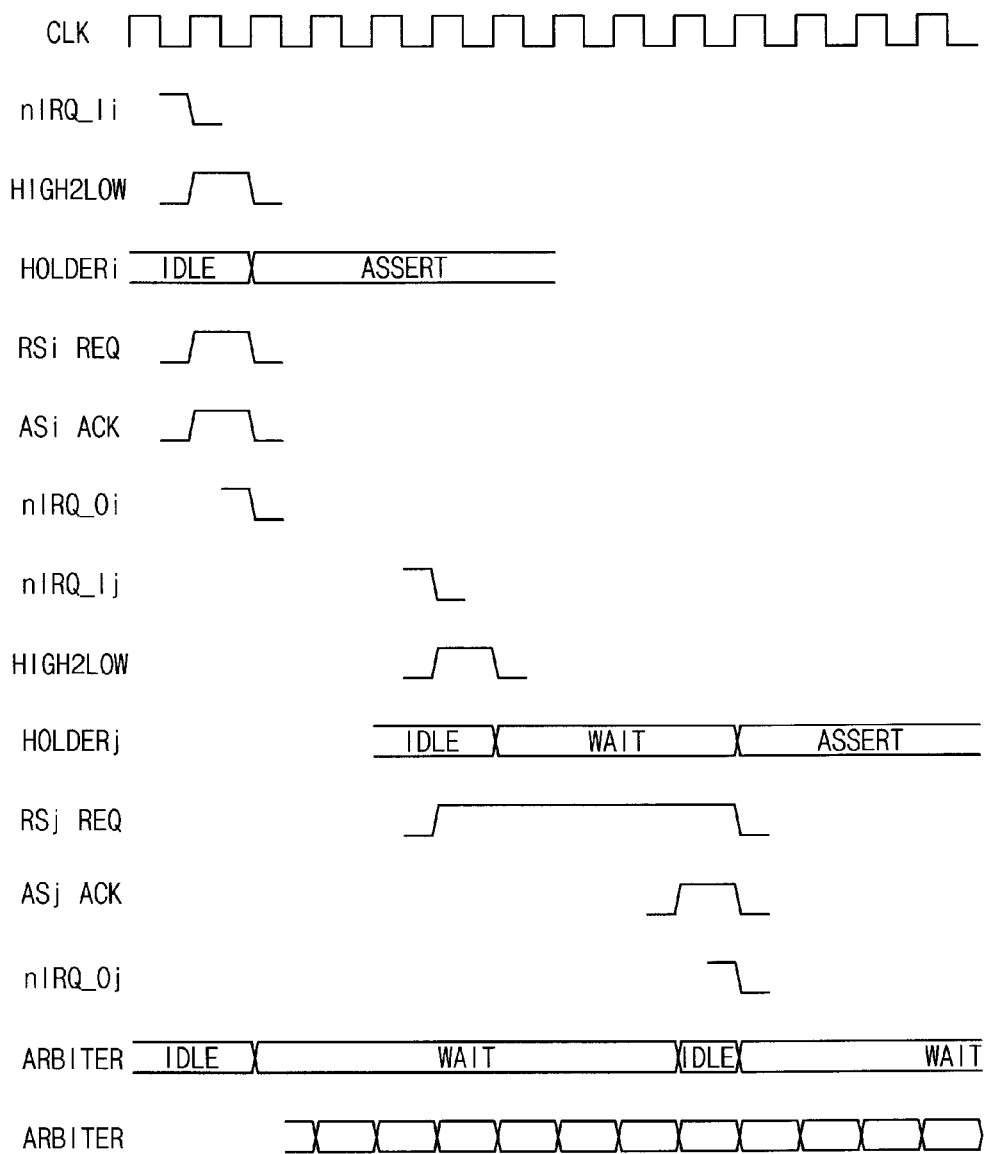
FIG. 15 is a timing diagram illustrating example operation of the interrupt request signal spreader circuit of FIG. 12.

FIG. 15 is a timing diagram illustrating example operation of the interrupt request signal spreader circuit of FIG. 12.

Referring to FIG. 15, when an (i)th interrupt request signal nIRQ_Ii is input to the (i)th interrupt request signal holder 120_i in the interrupt request signal spreader circuit 100, the (i)th interrupt request signal holder 120_i outputs an output-request signal RSi REQ to the interrupt request signal arbiter 140. Because the interrupt request signal arbiter 140 is in an idle-state IDLE (no previous interrupt request signal exists), the interrupt request signal arbiter 140 outputs an output-acknowledge signal ASi ACK to the (i)th interrupt request signal holder 120_i immediately.

In response to the output-acknowledge signal ASi ACK, the (i)th interrupt request signal holder 120_i transitions from the idle-state IDLE to an assert-state ASSERT, and the interrupt request signal arbiter 140 transitions from the idle-state IDLE to a wait-state WAIT. Thus, the (i)th interrupt request signal nIRQ_Oi is output to the (i)th processor.

While the interrupt request signal spreader circuit 140 is in the wait-state WAIT, if the (j)th interrupt request signal holder 120_j outputs an output request signal RSj REQ to the interrupt request signal arbiter 140 in response to receiving a (j)th interrupt request signal nIRQ_Ij, then the interrupt request signal arbiter 140 does not output an output-acknowledge signal ASj ACK to the (j)th interrupt request signal holder 120_j. The time period during which the interrupt request signal arbiter 140 stays in the wait-state WAIT may be determined by considering various conditions such as physical characteristics, etc., and may be adjusted by a circuit such as a counter, etc.

According to at least some example embodiments, the (j)th interrupt request signal holder 120j may transition from the idle-state IDLE to a wait-state WAIT, rather than an assert-state ASSERT. After the interrupt request signal arbiter 140 enters the idle-state IDLE from a wait-state WAIT, when a time interval between the (i)th interrupt request signal nIRQ_Oi and the (j)th interrupt request signal nIRQ_Oj becomes at least the same or substantially the same as the time interval threshold, the interrupt request signal arbiter 140 outputs an output-acknowledge signal ASj ACK to the (j)th interrupt request signal holder 120_j. In response to the output-acknowledge signal ASj ACK, the (j)th interrupt request signal holder 120_j transitions from the wait-state WAIT to the assert-state ASSERT, and outputs the (j)th interrupt request signal nIRQ_Oj to the (j)th processor.

As illustrated in FIG. 15, the (i)th interrupt request signal nIRQ_Oi and the (j) th interrupt request signal nIRQ_Oj may be output to the (i)th processor and the (j)th processor, respectively, at a time interval that is greater than or equal to the time interval threshold.

As described above, by controlling time intervals between a plurality of interrupt request signals (e.g., a time interval between adjacent interrupt request signals) to be greater than or equal to the time interval threshold, the interrupt request signal spreader circuit 100 may suppress and/or prevent modes of a plurality of processors (or a plurality of cores in a multi-core processor) from being continuously changed from an inactive state to an active state within a relatively small time period (sometimes referred to as a sudden wake-up) even when the interrupts are continuously generated by a plurality of interrupt sources within a relatively small time period.

Figure 16:
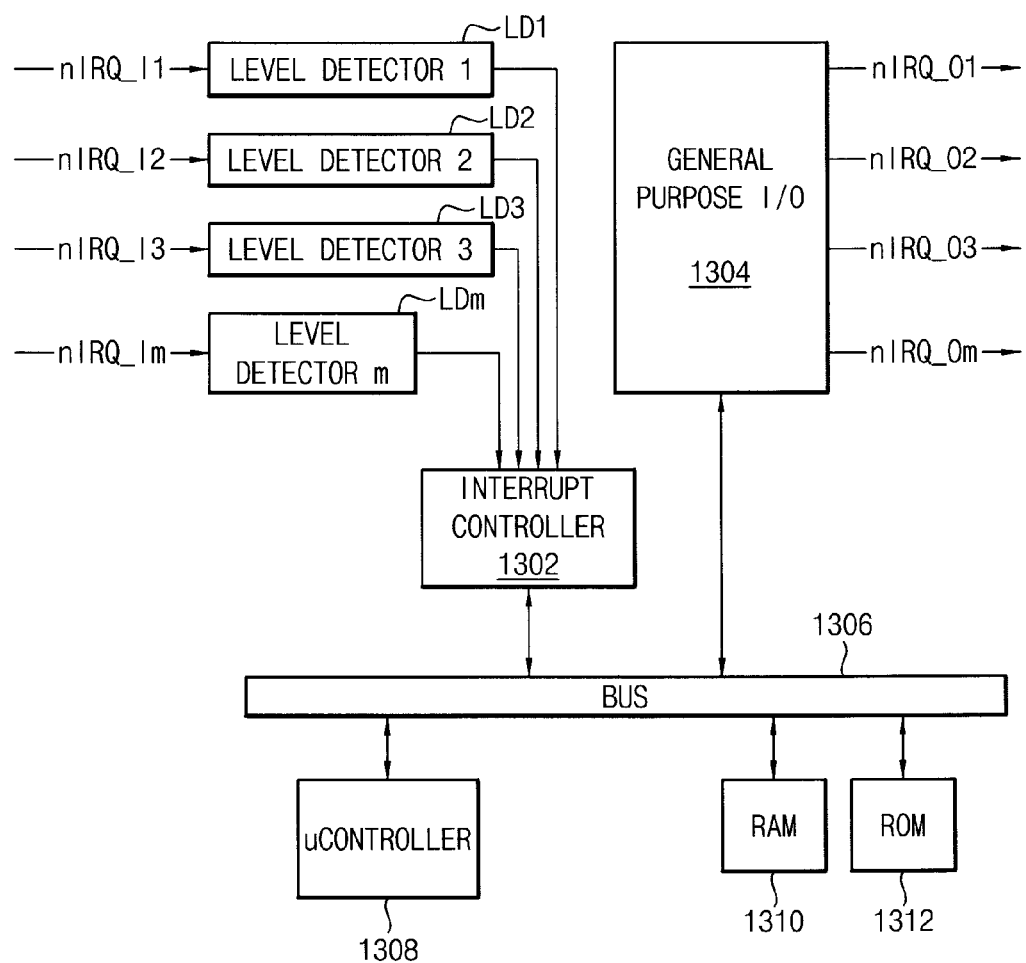
FIG. 16 is a block diagram illustrating an interrupt request signal spreader circuit according to another example embodiment.

FIG. 16 is a block diagram illustrating an example software implementation of an interrupt request signal spreader circuit according to an example embodiment. The interrupt request signal spreader circuit shown in FIG. 16 may serve as the interrupt request signal spreader circuit 560 shown in FIG. 1.

Referring to FIG. 16, the interrupt request signal spreader circuit includes a plurality of level detectors LD1, LD2, LD3, . . . , LDm. In this example, m is an integer greater than or equal to 2. The plurality of level detectors LD1 through LDm detect changes in respective ones of the plurality of interrupt request signals nIRQ_I1 through nIRQ_Im in order to identify/detect new interrupts (and/or interrupt requests) for the main processor. When new interrupts and/or interrupt requests for the main processor are detected, the microcontroller interrupt controller 1302 notifies the microcontroller 1308 via a bus 1306.

The microcontroller 1308 controls output of the new interrupt requests (e.g., new interrupt requests from among the interrupt request signals nIRQ_I1 through nIRQ_Im) such that the time intervals between the output of the interrupt request signals (e.g., ones of the nIRQ_O1 through nIRQ_Om corresponding to the new interrupt requests) is greater than or equal to the time interval threshold. For example, the microcontroller 1308 may delay the new interrupt request for a given or desired time period (e.g., by storing the interrupt request in random access memory (RAM) 1310), and then output the interrupt request signal through the general purpose I/O circuit 1304.

The RAM 1310 and/or the read only memory (ROM) 1312 shown in FIG. 16 are configured to store interrupt requests during the above-discussed delay, and/or store an indication as to the action to be taken in response to the detected interrupt signal.

The microcontroller 1308 updates the physical signals on the interrupt output lines nIRQ_O1 through nIRQ_Om via the general purpose I/O circuit 1304. The microcontroller 1308 communicates with the general purpose I/O circuit 1304 via the bus 1306. Because general purpose I/O circuits such as that shown in FIG. 16 are well-known, a detailed discussion is omitted.

The signals are output to, for example, processors 580_1 through 580_m in the same or substantially the same manner as discussed above with regard to at least some other example embodiments.

Figure 17:
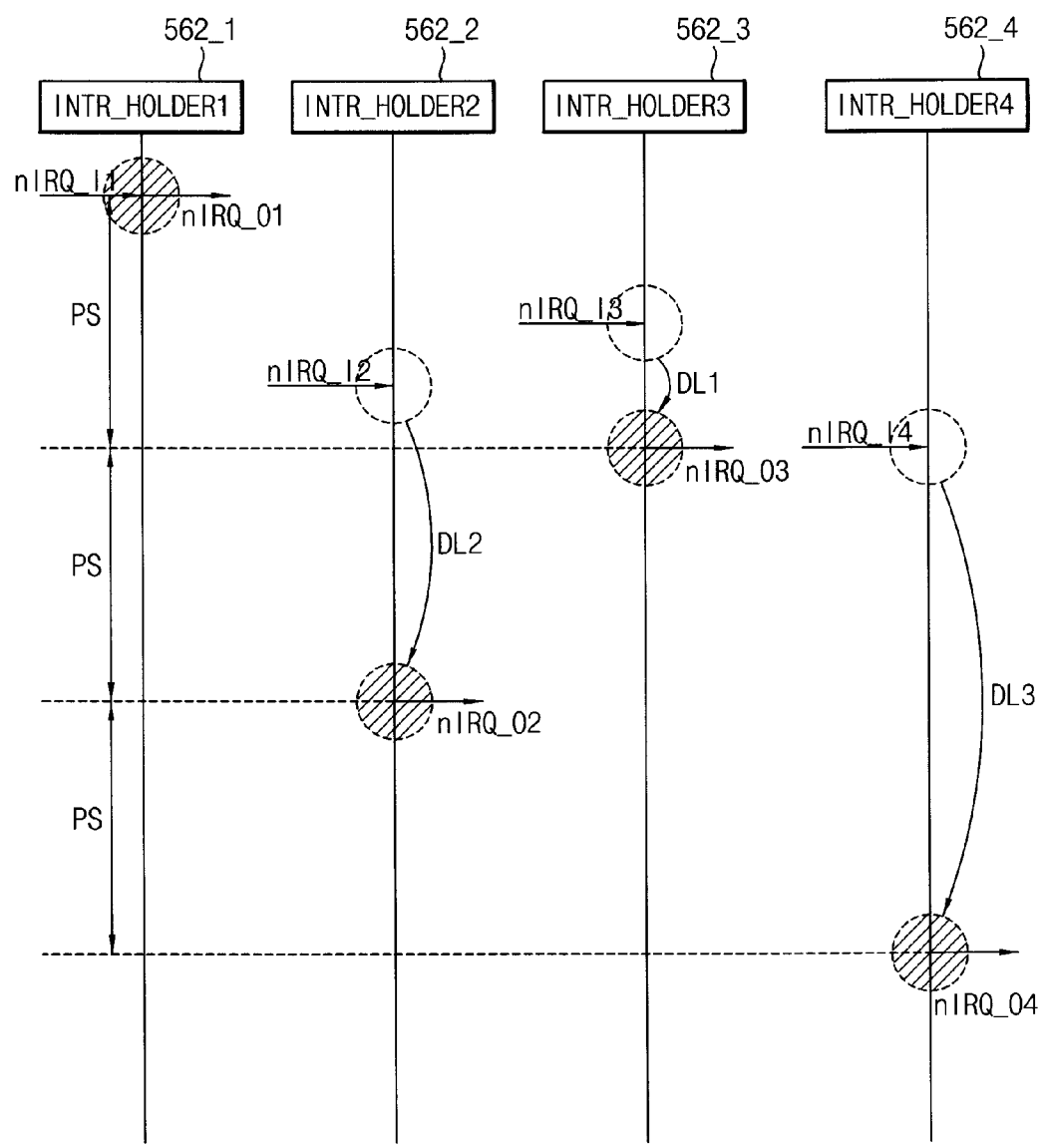
FIG. 17 is a diagram illustrating example operation of the interrupt request signal spreader circuit shown in FIG. 1.

According to at least this example embodiment, the microcontroller interrupt controller 1302 shown in FIG. 16 is separate from the interrupt controller 540 shown in FIG. 1. FIG. 17 is a diagram illustrating example operation of an interrupt request signal spreader circuit for the SOC of FIG. 1.

FIG. 17 shows an example in which the first through (m)th interrupt request signal holders 562_1 through 562_m of the interrupt request signal spreader circuit 560 are controlled by an interrupt request signal arbiter (not illustrated) of the interrupt request signal spreader circuit 560 in the SOC 500. Thus, the first through (m)th interrupt request signals nIRQ_I1 through nIRQ_Im may be output to the first through (m)th processors 580_1 through 580_m as the first through (m)th interrupt request signals nIRQ_O1 through nIRQ_Om, respectively, at time intervals corresponding to the time interval threshold PS. As illustrated in FIG. 17, for convenience it is assumed that m is 4.

In more detail, when the first through (n)th interrupt sources 520_1 through 520_n output the first through (n)th interrupts INT_R1 through INT_Rn, the interrupt controller 540 generates the first through fourth interrupt request signals nIRQ_I1 through nIRQ_I4 based on the first through (n)th interrupts INT_R1 through INT_Rn. As illustrated in FIG. 17, the first interrupt request signal nIRQ_I1, the third interrupt request signal nIRQ_I3, the second interrupt request signal nIRQ_I2, and the fourth interrupt request signal nIRQ_I4 are sequentially received by the first request signal holder 562_1, the third interrupt request signal holder 562_3, the second interrupt request signal holder 562_2 and the fourth interrupt request signal holder 562_4, respectively.

The first interrupt request signal holder 562_1 outputs the first interrupt request signal nIRQ_O1 to the first processor 580_1 immediately because no previous interrupt request signal prior to the first interrupt request signal nIRQ_I1 exists. The third interrupt request signal holder 562_3 delays the output of the third interrupt request signal nIRQ_I3 by a time period DL1 because a time interval between the first interrupt request signal nIRQ_I1 and the third interrupt request signal nIRQ_I3 is smaller than the time interval threshold PS. The third interrupt request signal holder 562_3 then outputs the third interrupt request signal nIRQ_O3 to the third processor 580_3

The second interrupt request signal holder 562_2 delays output of the second interrupt request signal nIRQ_I2 by a time period DL2, and then outputs the second interrupt request signal nIRQ_O2 to the second processor 580_2.

The fourth interrupt request signal holder 562_4 delays output of the fourth interrupt request signal nIRQ_I4 by a time period DL3, and then outputs the fourth interrupt request signal nIRQ_O4 to the fourth processor 580_4.

According to at least this example embodiment, in-rush currents due to a sudden wake-up of the first through fourth processors 580_1 through 580_4 may be suppressed and/or prevented because the first through fourth processors 580_1 through 580_4 receive the first through fourth interrupt request signals nIRQ_O1 through nIRQ_O4, respectively, at a time interval corresponding to at least the time interval threshold PS.

Figure 18:
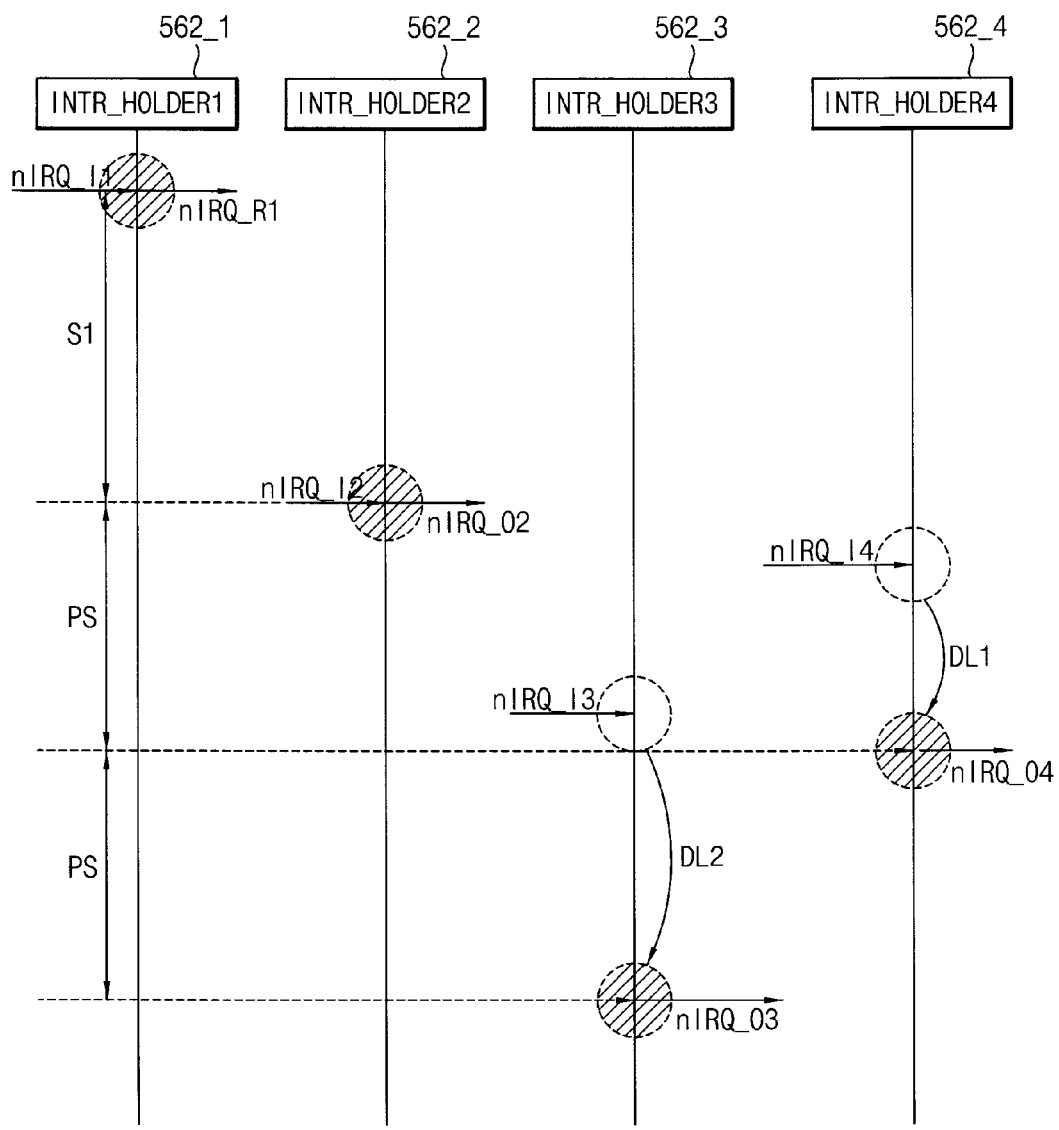
FIG. 18 is a diagram illustrating another example operation of the interrupt request signal spreader circuit shown in FIG. 1.

FIG. 18 is a diagram illustrating another example operation of an interrupt request signal spreader circuit for the SOC of FIG. 1.

FIG. 18 shows an example in which the first through (m)th interrupt request signal holders 562_1 through 562_m of the interrupt request signal spreader circuit 560 are controlled by an interrupt request signal arbiter (not illustrated in FIG. 18) of the interrupt request signal spreader circuit 560 in the system-on-chip 500. In this example, the first through (m)th interrupt request signals nIRQ_I1 through nIRQ_Im are output to the first through (m)th processors 580_1 through 580_m as the first through (m)th interrupt request signals nIRQ_O1 through nIRQ_Om, respectively, at time intervals that are greater than or equal to the time interval threshold PS. As illustrated in FIG. 18, for convenience it is assumed that m is 4.

In more detail, when the first through (n)th interrupt sources 520_1 through 520_n output the first through (n)th interrupts INT_R1 through INT_Rn, the interrupt controller 540 generates the first through fourth interrupt request signals nIRQ_I1 through nIRQ_I4 based on the first through (n)th interrupts INT_R1 through INT_Rn. As illustrated in FIG. 18, the first interrupt request signal nIRQ_I1, the second interrupt request signal nIRQ_I2, the fourth interrupt request signal nIRQ_I4, and the third interrupt request signal nIRQ_I3 are sequentially received by the first interrupt request signal holder 562_1, the second interrupt request signal holder 562_2, the fourth interrupt request signal holder 562_4, and the third interrupt request signal holder 562_3, respectively.

The first interrupt request signal holder 562_1 outputs the first interrupt request signal nIRQ_O1 to the first processor 580_1 immediately because no previous interrupt request signal prior to the first interrupt request signal nIRQ_I1 exists.

The second interrupt request signal holder 562_2 also outputs the second interrupt request signal nIRQ_O2 to the second processor 580_2 immediately because a time interval S1 between the first interrupt request signal nIRQ_I1 and the second interrupt request signal nIRQ_I2 is greater than the time interval threshold PS.

The fourth interrupt request signal holder 562_4 delays output for the fourth interrupt request signal nIRQ_O4 by a time period DL1 because a time interval between the second interrupt request signal nIRQ_I2 and the fourth interrupt request signal nIRQ_I4 is smaller than the time interval threshold PS. The fourth interrupt request signal holder 562_4 then outputs the fourth interrupt request signal nIRQ_O4 to the fourth processor 580_4.

The third interrupt request signal holder 562_3 delays output of the third interrupt request signal nIRQ_O3 by a time period DL2 after the second interrupt request signal nIRQ_O3 is output, and then outputs the third interrupt request signal nIRQ_O3 to the third processor 580_3.

According to at least this example embodiment, in-rush currents due to a sudden wake-up of the first through fourth processors 580_1 through 580_4 may be suppressed and/or prevented because the first through fourth processors 580_1 through 580_4 receive the first through fourth interrupt request signals nIRQ_O1 through nIRQ_O4, respectively, at a time interval that is greater than or equal to the time interval threshold PS.

Figure 19:
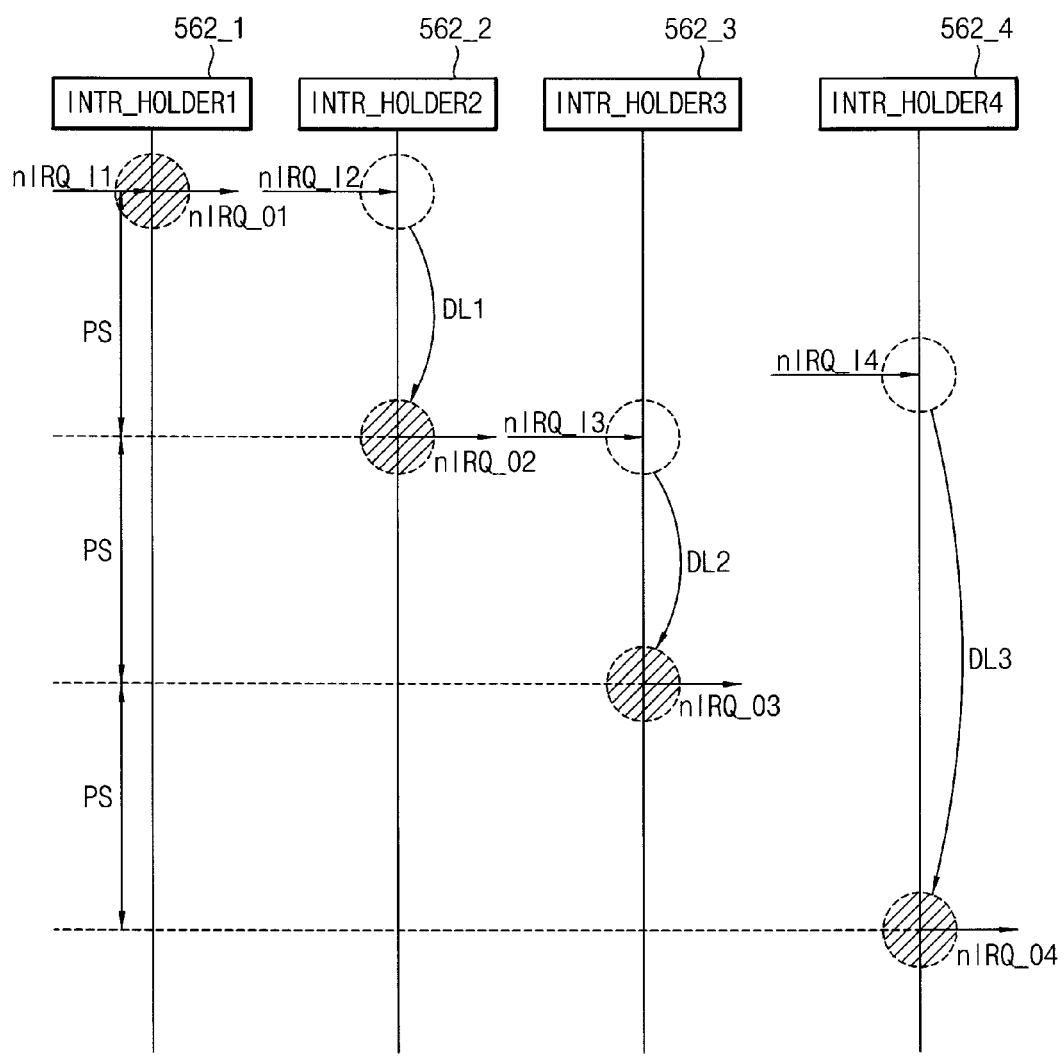
FIG. 19 is a diagram illustrating still another example operation of the interrupt request signal spreader circuit shown in FIG. 1.

FIG. 19 is a diagram illustrating still another example operation of an interrupt request signal spreader circuit for the SOC of FIG. 1.

FIG. 19 shows an example in which the first through (m)th interrupt request signal holders 562_1 through 562_m of the interrupt request signal spreader circuit 560 are controlled by an interrupt request signal arbiter (not illustrated in FIG. 19) of the interrupt request signal spreader circuit 560 in the SOC 500. Thus, the first through (m)th interrupt request signals nIRQ_I1 through nIRQ_Im are output to the first through (m)th processors 580_1 through 580_m as the first through (m)th interrupt request signals nIRQ_O1 through nIRQ_Om, respectively, at time intervals corresponding to the time interval threshold PS. As illustrated in FIG. 19, for convenience it is assumed that m is 4.

When the first through (n)th interrupt sources 520_1 through 520_n output the first through (n)th interrupts INT_R1 through INT_Rn, the interrupt controller 540 generates the first through fourth interrupt request signals nIRQ_I1 through nIRQ_I4 based on the first through (n)th interrupts INT_R1 through INT_Rn. As illustrated in FIG. 19, the first interrupt request signal nIRQ_I1 and the second interrupt request signal nIRQ_I2 are simultaneously or concurrently received by the first interrupt request signal holder 562_1 and the second interrupt request signal holder 562_2, respectively. Then, the fourth interrupt request signal nIRQ_I4 and the third interrupt request signal nIRQ_I3 are sequentially received by the fourth interrupt request signal holder 562_4 and the third interrupt request signal holders 562_3, respectively. Here, it is assumed that a priority of the first interrupt request signal nIRQ_I1 is higher than a priority of the second interrupt request signal nIRQ_I2. Thus, in this example the first interrupt request signal holder 562_1 outputs the first interrupt request signal nIRQ_O1 to the first processor 580_1 immediately.

The second interrupt request signal holder 562_2 delays output of the second interrupt request signal nIRQ_I2 by a time period DL1 (e.g., by the time interval threshold PS), and then outputs the second interrupt request signal nIRQ_O2 to the second processor 580_2.

The fourth interrupt request signal nIRQ_O4 and the third interrupt request signal nIRQ_O3 are output to the fourth processor 580_4 and the third processor 580_3, respectively, regardless or independent of the input order of the fourth interrupt request signal nIRQ_I4 and the third interrupt request signal nIRQ_I3. Here, it is assumed that a priority of the third interrupt request signal nIRQ_I3 is higher than a priority of the fourth interrupt request signal nIRQ_I4. The third interrupt request signal holder 562_3 delays output of the third interrupt request signal nIRQ_O3 by a time period DL2, and then outputs the third interrupt request signal nIRQ_O3 to the third processor 580_3. The fourth interrupt request signal holder 562_4 delays output of the fourth interrupt request signal nIRQ_O4 by a time period DL3, and then outputs the fourth interrupt request signal nIRQ_O4 to the fourth processor 580_4.

According to at least this example embodiment, in-rush currents due to a sudden wake-up of the first through fourth processors 580_1 through 580_4 may be suppressed and/or prevented because the first through fourth processors 580_1 through 580_4 receive the first through fourth interrupt request signals nIRQ_O1 through nIRQ_O4, respectively, at time intervals corresponding to the time interval threshold PS.

Figure 20:
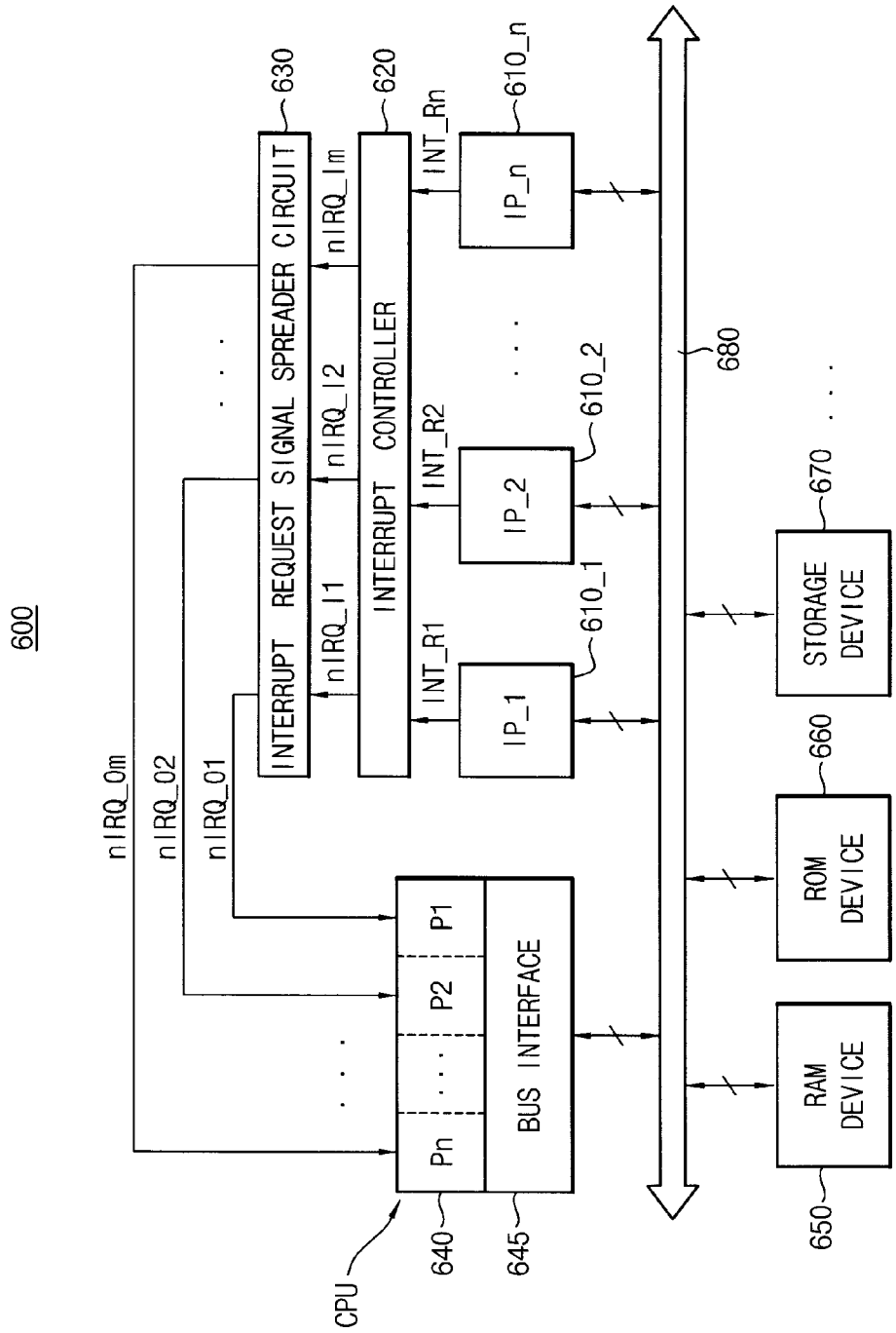
FIG. 20 is a block diagram illustrating a multi-core system according to an example embodiment.
Figure 21:
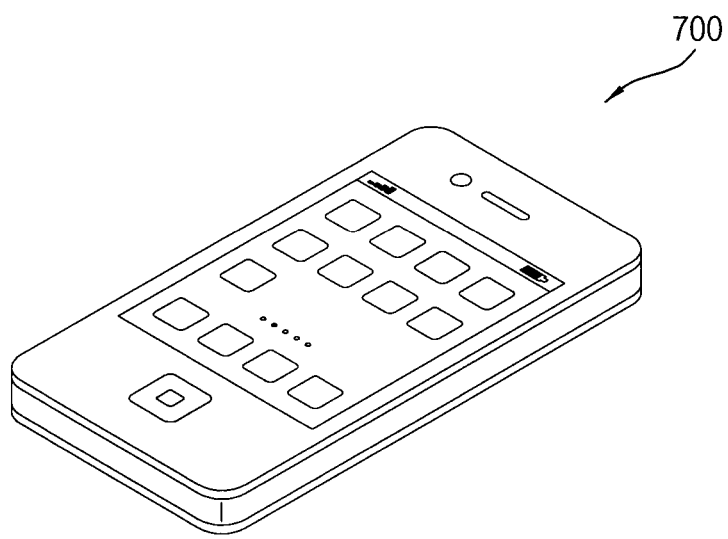
FIG. 21 is a diagram illustrating an example in which a multi-core system of FIG. 20 is implemented as a smart phone.

FIG. 20 is a block diagram illustrating a multi-core system according to example embodiments, and FIG. 21 is a diagram illustrating an example in which a multi-core system of FIG. 20 is implemented as a smart phone.

Referring to FIGS. 20 and 21, the multi-core system 600 includes first through (n)th interrupt sources 610_1 through 610_n, an interrupt controller 620, an interrupt request signal spreader circuit 630, a multi-core processor 640, a bus interface 645, a random access memory (RAM) device 650, a read only memory (ROM) device 660, a storage device 670, a system bus 680, etc. Here, the multi-core processor 640 includes first through (m)th cores P1 through Pm. In one example, the multi-processor may be referred to as a dual-core processor if m is 2, may be referred to as a quad-core processor if m is 4, etc.

As illustrated in FIG. 21, the multi-core system 600 may be implemented as a smart-phone 700. However, the multi-core system 600 is not limited thereto. For example, the multi-core system 600 may be implemented as an electric device such as a smart-television, a smart-pad, a cellular phone, etc. Further, it should be understood that the multi-core system 600 corresponds to a system that includes a multi-core processor having a plurality of cores, or a system that includes a plurality of processors, each having one or more cores.

The first through (n)th interrupt sources 610_1 through 610_n may generate and output first through (n)th interrupts INT_R1 through INT_Rn, respectively. The first through (n)th interrupt sources 610_1 through 610_n may correspond to components of a system-on-chip (SOC) such as a video module, a sound module, a display module, a memory module, a communication module, a camera module, etc. That is, for example, the first through (n)th interrupt sources 610_1 through 610_n may be intellectual property (IP) blocks that perform specific operations for the multi-core system 600.

The interrupt controller 620 generates first through (m)th interrupt request signals nIRQ_I1 through nIRQ_Im based on the first through (n)th interrupts INT_R1 through INT_Rn output from the first through (n)th interrupt sources 610_1 through 610_n. The interrupt request signal spreader circuit 630 controls time intervals between the first through (m)th interrupt request signals nIRQ_I1 through nIRQ_Im (e.g., a time interval between adjacent interrupt request signals) output from the interrupt controller 620 to be greater than or equal to the time interval threshold.

As illustrated in FIG. 20, the first through (m)th interrupt request signals nIRQ_O1 through nIRQ_Om are output to the first through (m)th cores P1 through Pm of the multi-core processor 640, respectively. For this operation, the interrupt request signal spreader circuit 630 includes first through (m)th interrupt request signal holders, and an interrupt request signal arbiter for controlling the first through (m)th interrupt request signal holders. Because the interrupt request signal spreader circuit 630 is described in detail above, a duplicate description is omitted below.

The multi-core processor 640 is coupled to other components via a system bus 680 using a bus interface 645. The multi-core processor 640 is configured to communicate with the intellectual property (IP) blocks 610_1 through 610_n, the RAM device 650, the ROM device 660, the storage device 670, etc., via a system bus 680 such as an address bus, a control bus, a data bus, etc. The storage device 670 may include a hard disk drive (HDD), a solid state drive (SSD), a redundant array of independent disk (RAID), etc. According to at least some example embodiments, the multi-core processor 640 may be coupled to an extended bus such as peripheral component interconnect (PCI) bus.

Although not illustrated in FIG. 20, the multi-core system 600 may further include at least one non-volatile memory device and/or at least one volatile memory device. For example, the non-volatile memory device may correspond to an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In addition, the volatile memory device may correspond to a dynamic random access memory (DRAM) device, a static random access memory (SRAM) device, a mobile DRAM device, etc.

As illustrated in FIG. 20, the multi-core system 600 includes a system bus path for transferring (receiving and transmitting) data and an interrupt path for handling interrupts output from the intellectual property (IP) blocks 610_1 through 610_n. The multi-core processor 640 may perform specific operations for the intellectual property (IP) blocks 610_1 through 610_n based on the system bus path. In addition, the multi-core processor 640 may perform interrupt handling operations for the intellectual property (IP) blocks 610_1 through 610_n based on the interrupt path. The multi-core system 600 may be implemented by various packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP).

Example embodiments may be applied to electric devices including a plurality of processors (or a multi-core processor). For example, at least some example embodiments may be applied to electric devices such as cellular phones, smart phones, computers, laptops, workstations, smart-pads, security systems, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of inventive concepts. Accordingly, all such modifications are intended to be included within the scope of inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of power control for a system-on-chip, the method comprising:
generating, at a wakeup request signal controller, at least a first wakeup request signal and a second wakeup request signal, the first wakeup request signal and the second wakeup request signal being one of concurrent and consecutive wakeup request signals;
outputting the first wakeup request signal and the second wakeup request signal from the wakeup request signal controller to a wakeup request signal interrupt spreading circuit;
comparing, at the wakeup request signal spreading circuit, a first time difference with a time interval threshold, the first time difference being a time difference between receipt of the first wakeup request signal and the second wakeup request signal;
controlling, at the wakeup request signal spreading circuit, output of at least one of the first wakeup request signal and the second wakeup request signal from the wakeup request signal spreading circuit based on the comparison between the first time difference and the time interval threshold such that a time interval between the output of the first wakeup request signal from the wakeup request signal spreading circuit and the output of the second wakeup request signal from the wakeup request signal spreading circuit is greater than or equal to the time interval threshold; and
wherein the time interval threshold is set within a range in which in-rush currents are not generated in processors when modes of the processors are changed from an inactive state to an active state.

2. The method of claim 1, wherein the first and second wakeup request signals are interrupt request signals.

3. The method of claim 1, wherein the controlling comprises:
delaying the output of at least one of the first wakeup request signal and the second wakeup request signal from the wakeup request signal spreading circuit if the first time difference is less than the time interval threshold.

4. The method of claim 1, wherein the controlling comprises:
outputting the first and second wakeup request signals from the wakeup request signal spreading circuit without additional or intentional delay if the first time difference is greater than or equal to the time interval threshold.

5. A method of power control for a system-on-chip, the method comprising:
generating, at a wakeup request signal controller, at least a first wakeup request signal and a second wakeup request signal, the first wakeup request signal and the second wakeup request signal being one of concurrent and consecutive wakeup request signals;
outputting the first wakeup request signal and the second wakeup request signal from the wakeup request signal controller to a wakeup request signal spreading circuit;
comparing, at the wakeup request signal spreading circuit, a first time difference with a time interval threshold, the first time difference being a time difference between receipt of the first wakeup request signal and the second wakeup request signal;
comparing, at the wakeup request signal spreading circuit, a first priority of the first wakeup request signal with a second priority of the second wakeup request signal;
controlling, at the wakeup request signal spreading circuit, output of at least one of the first wakeup request signal and the second wakeup request signal from the wakeup request signal spreading circuit based on the comparison between the first priority and the second priority and based on the comparison between the first time difference and the time interval threshold such that a time difference between the output of the first wakeup request signal from the wakeup request signal spreading circuit and the output of the second wakeup request signal from the wakeup request signal spreading circuit is greater than or equal to the time interval threshold; and wherein the time interval threshold is set within a range in which in-rush currents are not generated in processors when modes of the processors are changed from an inactive state to an active state.

6. The method of claim 5, wherein the first and second wakeup request signals are interrupt request signals.

7. The method of claim 5, wherein the controlling comprises:

delaying the output of at least one of the first wakeup request signal and the second wakeup request signal from the wakeup request signal spreading circuit based on the comparison between the first priority and the second priority and the comparison between the first time difference and the time interval threshold.

8. The method of claim 7, wherein
the first priority is greater than the second priority; and
the delaying includes,
  delaying the output of the second wakeup request signal from the wakeup request signal spreading circuit.

9. The method of claim 7, wherein
the first wakeup request signal is received prior to the second wakeup request signal; and
the delaying includes,
  delaying the output of the first wakeup request signal from the wakeup request signal spreading circuit.

10. The method of claim 5, wherein the first and second wakeup request signals are one of consecutive and concurrent wakeup request signals.

11. The method of claim 5, wherein
the first wakeup request signal and the second wakeup request signal are associated with function blocks in the inactive state; and
the controlling includes,
  outputting the first and second wakeup request signals from the wakeup request signal spreading circuit without delay.

12. A method of power control for a system-on-chip, the method comprising:

outputting a first wakeup request signal and a second wakeup request signal from a wakeup request signal controller to a wakeup request signal spreading circuit, the first wakeup request signal and the second wakeup request signal being one of concurrent and consecutive wakeup request signals;

comparing, at the wakeup request signal spreading circuit, a first time difference with a time interval threshold, the first time difference being a time difference between receipt of the first wakeup request signal and the second wakeup request signal;

controlling, at the wakeup request signal spreading circuit, output of at least one of the first wakeup request signal to a first processor in an inactive state and the second wakeup request signal to a second processor in the inactive state based on the comparison between the first time difference and the time interval threshold such that a time interval between the output of the first wakeup request signal from the wakeup request signal spreading circuit to the first processor and the output of the second wakeup request signal from the wakeup request signal spreading circuit to the second processor is greater than or equal to the time interval threshold; and wherein the time interval threshold is set within a range in which in-rush currents are not generated in the first and second processors when modes of the first and second processors are changed from the inactive state to an active state.

13. The method of claim 12, wherein the first and second wakeup request signals are interrupt request signals.

14. The method of claim 12, wherein the controlling comprises:

delaying the output of at least one of the first wakeup request signal and the second wakeup request signal from the wakeup request signal spreading circuit if the first time difference is less than the time interval threshold.

15. The method of claim 12, wherein the controlling comprises:

outputting the first and second wakeup request signals from the wakeup request signal spreading circuit without delay if the first time difference is greater than or equal to the time interval threshold.

16. The method of claim 12, further comprising:

controlling output of a third wakeup request signal from the wakeup request signal spreading circuit to a third processor in the inactive state such that a time interval between output of the second wakeup request signal from the wakeup request signal spreading circuit to the second processor and output of the third wakeup request signal from the wakeup request signal spreading circuit to the third processor is greater than or equal to the time interval threshold, the second wakeup request signal and the third wakeup request signal being one of concurrent and consecutive wakeup request signals.

17. The method of claim 12, wherein
the first wakeup request signal and the second wakeup request signal are concurrent wakeup request signals; and
the controlling includes,
  delaying the output of at least one of the first wakeup request signal and the second wakeup request signal from the wakeup request signal spreading circuit based on priorities associated with the first wakeup request signal and the second wakeup request signal.

18. A system-on-chip comprising:

a wakeup request signal controller configured to generate and output at least first and second wakeup request signals based on at least first and second wakeup signals from one or more wakeup signal sources, the first wakeup request signal and the second wakeup request signal being one of concurrent and consecutive wakeup request signals; and a wakeup request signal spreading circuit connected between the wakeup request signal controller and first and second function blocks, the wakeup request signal spreading circuit being configured to,
  compare, with a time interval threshold, a first time difference between receipt of the first wakeup request signal and the second wakeup request signal,
  control, based on the comparison between the first time difference and the time interval threshold, output of at least one of the first wakeup request signal to the first function block and the second wakeup request signal to the second function block such that a time interval between output of the first wakeup request signal from the wakeup request signal spreading circuit to the first function block and output of the second wakeup request signal from the wakeup request signal spreading circuit to the second function block is greater than or equal to the time interval threshold, and wherein the time interval threshold is set within a range in which in-rush currents are not generated in the first and second function blocks when modes of the first and second function blocks are changed from an inactive state to an active state.

19. The system-on-chip of claim 18, wherein the first and second wakeup request signals are interrupt request signals.

20. The system-on-chip of claim 18, wherein the wakeup request signal spreading circuit comprises:

an arbiter configured to compare the first time difference with the time interval threshold, and to generate a plurality of output acknowledge signals based on the comparison; and wherein the wakeup request signal spreading circuit is configured to control the output of at least one of the first wakeup request signal and the second wakeup request signal based on the plurality of output acknowledge signals.

21. The system-on-chip of claim 20, wherein the wakeup request signal spreading circuit further comprises:

a first interrupt request signal holder circuit configured to store the first wakeup request signal, the first interrupt request signal holder circuit being further configured to output the first wakeup request signal in response to a first of the plurality of output acknowledge signals; and a second interrupt request signal holder circuit configured to store the second wakeup request signal, the second interrupt request signal holder circuit being further configured to output the second wakeup request signal in response to a second of the plurality of output acknowledge signals.

22. The system-on-chip of claim 20, wherein the wakeup request signal spreading circuit is configured to delay the output of at least one of the first wakeup request signal and the second wakeup request signal if the first time difference is less than the time interval threshold.

23. The system-on-chip of claim 18, wherein the wakeup request signal spreading circuit comprises:

a first level detector configured to detect the first wakeup request signal;

a second level detector configured to detect the second wakeup request signal; and a micro-controller configured to control, based on the comparison between the first time difference and the time interval threshold, the output of at least one of the first wakeup request signal to the first function block and the second wakeup request signal to the second function block.

24. A multi-core system comprising:

a plurality of wakeup signal sources configured to generate at least first and second wakeup signals;

a wakeup request signal controller configured to generate and output at least first and second wakeup request signals based on the first and second wakeup signals;

a multicore processor including at least a first core and a second core, the first core being configured to receive the first wakeup request signal, and the second core being configured to receive the second wakeup request signal;

a wakeup request signal spreading circuit connected between the wakeup request signal controller and the multicore processor, the wakeup request signal spreading circuit being configured to, compare, with a time interval threshold, a first time difference between receipt of the first wakeup request signal and the second wakeup request signal, and control, based on the comparison between the first time difference and the time interval threshold, output of at least one of the first wakeup request signal from the wakeup request signal spreading circuit to the first core and the second wakeup request signal from the wakeup request signal spreading circuit to the second core such that a time interval between the output of the first wakeup request signal and the output of the second wakeup request signal is greater than or equal to the time interval threshold, the first wakeup request signal and the second wakeup request signal being one of concurrent and consecutive wakeup request signals;

at least one memory device configured to interface with the plurality of wakeup signal sources and the multicore processor via a system bus; and wherein the time interval threshold is set within a range in which in-rush currents are not generated in the first and second cores when modes of the first and second cores are changed from an inactive state to an active state.

* * * * *